US008559798B2

(12) United States Patent
Aoki et al.

(10) Patent No.: US 8,559,798 B2
(45) Date of Patent: Oct. 15, 2013

(54) IMAGE FRAME PROCESSING METHOD AND DEVICE FOR DISPLAYING MOVING IMAGES TO A VARIETY OF DISPLAYS

(75) Inventors: Sachiyo Aoki, Tokyo (JP); Akio Ohba, Kanagawa (JP); Masaaki Oka, Kanagawa (JP); Nobuo Sasaki, Kanagawa (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 1805 days.

(21) Appl. No.: 11/133,169

(22) Filed: May 19, 2005

(65) Prior Publication Data

US 2005/0271361 A1   Dec. 8, 2005

(30) Foreign Application Priority Data

May 19, 2004   (JP) .................................. 2004-149705
Mar. 30, 2005  (JP) .................................. 2005-100075

(51) Int. Cl.
| | |
|---|---|
| H04N 5/783 | (2006.01) |
| H04N 5/89 | (2006.01) |
| H04N 5/765 | (2006.01) |
| H04N 5/917 | (2006.01) |
| H04N 7/01 | (2006.01) |
| H04N 9/80 | (2006.01) |
| G06F 3/00 | (2006.01) |
| G06F 12/02 | (2006.01) |
| G06F 13/00 | (2006.01) |
| G06F 15/00 | (2006.01) |
| G06K 9/32 | (2006.01) |
| G06K 9/34 | (2006.01) |
| G06K 9/36 | (2006.01) |
| G06K 9/46 | (2006.01) |
| G06K 9/48 | (2006.01) |

(52) U.S. Cl.
USPC ........... 386/350; 386/200; 386/241; 386/243; 386/328; 386/334; 386/345; 345/501; 345/536; 345/566; 348/441; 348/446; 348/448; 382/176; 382/199; 382/249; 382/291; 382/294; 710/36

(58) Field of Classification Search
USPC ........ 386/68, 46, 109, 111, 112, 125, E5.001, 386/E5.012, E5.052, E5.07, 241, 243, E5.024, 386/E9.04; 345/501, 536, 566; 348/441, 348/446, 448, E5.006, E5.066, E5.067, E5.099, 348/E5.108, E7.003, E7.014, E7.063; 375/E7.004, E7.119, E7.135, E7.163, E7.182, 375/E7.211, E7.256; 707/10; 710/36; 382/176, 199, 249, 291, 294
See application file for complete search history.

(56) References Cited

U.S. PATENT DOCUMENTS 5,559,950 A * 9/1996 Cannon ......................... 345/501
(Continued)

FOREIGN PATENT DOCUMENTS

CN          1334677       2/2002
(Continued)

OTHER PUBLICATIONS

Notification of Reason(s) for Refusal, dated Feb. 3, 2009, for corresponding Japanese Application 2005-100075.
(Continued)

*Primary Examiner* — Thai Tran
*Assistant Examiner* — Syed Hasan
(74) *Attorney, Agent, or Firm* — Katten Muchin Rosenman LLP

(57) ABSTRACT

A rendering process for rendering an image frame and a postprocess for adapting the image frame to a display are separated. A rendering processing unit 42 generates an image frame sequence by performing rendering at a predetermined frame rate regardless of a condition that the image frame should meet for output to the display. A postprocessing unit 50 subjects the image frame sequence generated by the rendering processing unit to a merge process so as to generate and output an updated image frame sequence that meets the condition. Since the rendering process and the postprocess are separated, the image frame sequence can be generated regardless of the specification of the display such as resolution and frame rate of the display.

7 Claims, 22 Drawing Sheets

(56) References Cited

U.S. PATENT DOCUMENTS

| | | | |
|---|---|---|---|
| 5,737,027 A | | 4/1998 | Demos |
| 5,917,962 A | * | 6/1999 | Chen et al. ............... 382/291 |
| 6,137,947 A | * | 10/2000 | Ohta et al. ............... 386/200 |
| 6,441,818 B1 | * | 8/2002 | Kurose ............... 345/422 |
| 6,735,374 B1 | * | 5/2004 | Hashimoto ............... 386/241 |
| 7,233,362 B2 | * | 6/2007 | Wu ............... 348/448 |
| 2002/0101535 A1 | * | 8/2002 | Swan ............... 348/448 |
| 2002/0168175 A1 | * | 11/2002 | Green et al. ............... 386/68 |
| 2003/0001862 A1 | | 1/2003 | Chu et al. |
| 2003/0078930 A1 | * | 4/2003 | Surcouf et al. ............... 707/10 |
| 2003/0117382 A1 | | 6/2003 | Pawlowski et al. |
| 2003/0147629 A1 | * | 8/2003 | Kikuchi et al. ............... 386/69 |

FOREIGN PATENT DOCUMENTS

| | | | |
|---|---|---|---|
| EP | 0 622 957 | | 11/1994 |
| JP | 6-149902 | | 5/1994 |
| JP | 7-38842 | | 2/1995 |
| JP | 7-99634 | | 4/1995 |
| JP | 9-307858 | | 11/1997 |
| JP | 11234644 A | * | 8/1999 |
| JP | 11-331544 | | 11/1999 |
| JP | 2002-077810 | | 3/2002 |
| JP | 2002-94947 | | 3/2002 |
| JP | 2002-135705 | | 5/2002 |
| JP | 2003-078880 | * | 3/2003 |
| WO | WO 02/01341 | | 1/2002 |
| WO | WO 03/102903 | | 12/2003 |

OTHER PUBLICATIONS

European Search Report mailed Jun. 20, 2006.
International Search Report mailed Jun. 20, 2006.
Notification of Reason(s) for Refusal dated Oct. 7, 2008, from the corresponding Japanese Application.
Questioning dated Dec. 14, 2010, from corresponding Japanese Application No. 2005-100075.
European Search Report dated Mar. 10, 2011, from corresponding European Application No. 11 00 0385.
Notification of Reason(s) for Refusal dated Mar. 15, 2011, from corresponding Japanese Application No. 2008-308761.
Chinese Fourth Office Action dated Jan. 17, 2013, from corresponding Chinese Application No. 200810161915.5.
Chinese Third Office Action dated Jul. 18, 2012, from corresponding Chinese Application No. 200810161915.5.

* cited by examiner

IMAGE FRAME PROCESSING METHOD AND DEVICE FOR DISPLAYING MOVING IMAGES TO A VARIETY OF DISPLAYS

BACKGROUND OF THE INVENTION

1. Field of the Invention

The present invention generally relates to an image frame processing technology and, more particularly, to an image frame processing technology generating an image frame sequence adapted to a variety of rendering conditions.

2. Description of the Related Art

With the improvement in the technology for fabricating thin displays such as liquid crystal displays and plasma displays and with reduction in the price thereof, there are now a variety of display devices available around us for reproduction of moving images.

The specification of displayable image data including frame rate and resolution differs according to the types of the display. According to the related art, image data output from an image rendering apparatus are processed in the display device so that images adapted to that display are generated. In this arrangement, there will be an increase in the manpower required to develop circuits and software with an increase in the variety of frame rate and resolution that the display should be adapted to. The processing load placed on the display device is also increased in association with this.

SUMMARY OF THE INVENTION

The present invention has been done in view of the aforementioned problem and the object of the invention is to provide an image frame processing technology adapted to various types of displays.

One aspect of the present invention is an image frame processing method. This method includes a rendering process for rendering an image frame sequence and a postprocess for adapting the image frame sequence generated by the rendering process to a display. In the rendering process, the image frame sequence is generated by performing rendering at a predetermined frame rate regardless of a condition that the image frames should meet for output to the display. In the postprocess, the image frame sequence generated by the rendering process is subjected to a predetermined process so as to generate and output an updated image frame sequence that meets the condition.

Since the rendering process and the postprocess are separated, the image frame sequence can be generated regardless of the specification of the display such as resolution and frame rate of the display.

Another aspect of the invention provides a moving images displaying method for reading an image frame sequence from a memory and performing predetermined process to the image frame sequence for display, comprising: reading image frames to be displayed as fast-forwarding picture selectively from the memory when a fast-forwarding request occurs; and creating an updated image frames by performing a predetermined integrating process to the read image frames; and displaying the updated image frames.

According to this aspect, since fast-forwarding frames are created by integrating plural image frames, value-added fast-forwarding picture may be acquired. The "integrating process" herein refers to the process to create an updated image frame using part of or all of the image information included in plural image frames.

Implementations of the invention in the form of methods, apparatuses, systems, computer programs and recording mediums may also be practiced as additional modes of the present invention.

DETAILED DESCRIPTION OF THE INVENTION

First Embodiment

A description will now be given of an image frame processing device according to the present invention, by introducing embodiments in which the inventive device is applied to an entertainment apparatus for rendering three-dimensional computer graphic (CG) images.

Figure 1:
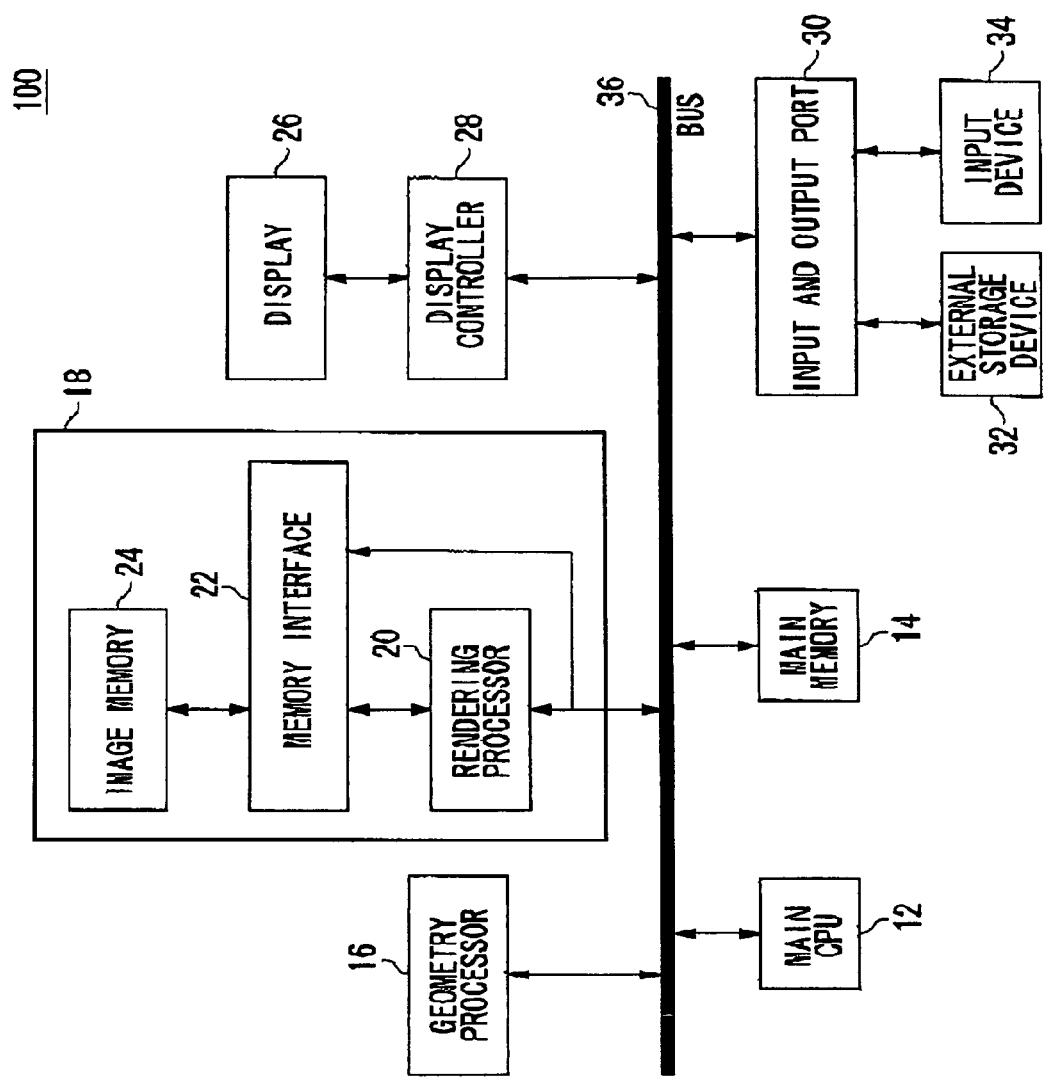
FIG. 1 shows a structure of hardware of an entertainment apparatus.

FIG. 1 shows a structure of hardware of an entertainment apparatus 100. The entertainment apparatus 100 is provided with a graphic chip 18 and is capable of real-time display of three-dimensional images on a display 26 by performing rendering.

The entertainment apparatus 100 is provided with a main CPU 12, a main memory 14, a geometry processor 16, a graphic chip 18, a display controller 28 and an input and output (I/O) port 30. These blocks are connected to each other via a graphic bus 36 to enable mutual data transmission and reception. The display controller 28 may be connected to one of various displays 26 each having different specification and display condition.

The input and output port 30 is connected to an external storage device 32 such as a CD-ROM drive, a DVD-ROM drive or a hard-disk drive, and to an input device 34 such as a keyboard or a mouse for feeding key input data and coordinates data to the entertainment apparatus 100. The input and output port 30 controls incoming and outgoing data in both the external storage device 32 and the input device 34. The input and output port 30 reads rendering data or programs stored in the external storage device 32 then provides them to the main CPU 12 and the geometry processor 16. For example, the rendering data may be object data for a rendered object. The input and output port 30 may be configured to communicate with other devices to import rendering data and programs.

The main CPU 12 controls the entertainment apparatus 100 globally and executes the rendering program stored in the external storage device 32. When the program is executed, the main CPU 12 controls the display of images by controlling the graphic chip 18 in accordance with inputs from a user using the input device 34.

The main CPU 12 controls the entertainment apparatus 100 by controlling transmission of data between the constituting devices. For example, the main CPU 12 controls transfer of geometry data generated by the geometry processor 16 to the graphic chip 18 using the main memory 14 as a buffer. The main CPU 12 also manages synchronization of data transfer between the graphic chip 18, the external storage device 32, the input device 34 and the display 26. In this embodiment, the geometry processor 16 and the main CPU 12 are provided separately. Alternatively, these elements may be integrated so that the main CPU 12 may perform the function of the geometry processor 16.

The main memory 14 stores object configuration data and rendering programs read from the external storage device 32. Each object data includes vertex data of a plurality of polygons constituting an associated object. The main memory 14 has a texture buffer area for storing a texture used for texture mapping.

Under the control of the main CPU 12, the geometry processor 16 performs geometry processes to the object data stored in the main memory 14 such as coordinate translation and transformation for defining the location or configuration, or processes related to a light source illuminating the vertices. The geometry data obtained as a result of the geometry processes include vertex coordinates of the object, texture coordinates at the vertexes and object attributes such as vertex brightness.

The graphic chip 18 includes a rendering processor 20, a memory interface 22 and an image memory 24 such as an EDRAM. The rendering processor 20 sequentially reads out the geometry data generated by the geometry processor 16 under the control of the main CPU 12 and performs a rendering process to the geometry data to generate an image frame. RGB values and α values, which indicate transparency, of the pixels within the image frame are stored in the image memory 24. Z values, which indicate the depth of the pixels, are stored in a Z buffer area (not shown). The Z buffer area may be provided in the image memory 24.

The rendering processor 20 of the graphic chip 18 renders an image frame in the image memory 24 via the memory interface 22, in accordance with a rendering command supplied from the main CPU 12. A high-speed bus connection is established between the rendering processor 20 and the memory interface 22, and between the memory interface 22 and the image memory 24 so that the rendering processor 20 is capable of performing a rendering process in the image memory 24 at a high speed. By way of example, the rendering processor 20 renders an image frame of 640*480 pixels.

The image frame rendered by the rendering processor 20 is temporarily stored in the image memory 24. The main CPU 12 retrieves the image frame from the image memory 24 via the memory interface 22 and writes the image frame in other memory such as the main memory 14. The main CPU 12 converts, as necessary, the image frame into an image frame displayable on the display 26. The display controller 28 then receives the image frame via the bus 36 and displays it on the display 26.

Figure 2:
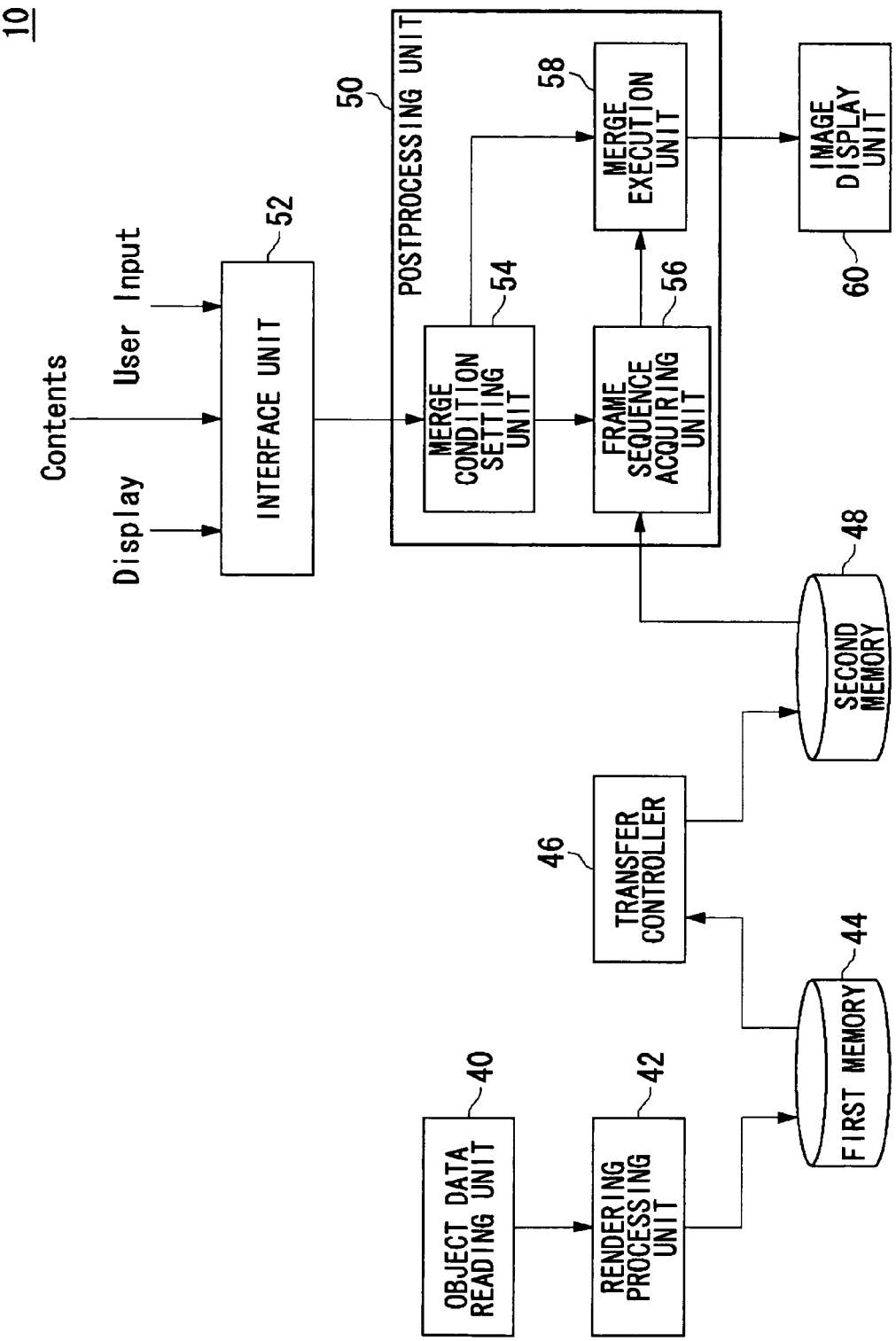
FIG. 2 is a function block diagram of an image frame processing device.

FIG. 2 is a functional block diagram of the image frame processing device 10. The functions of FIG. 2 are primarily implemented by the graphic chip 18, the main CPU 12 and the main memory 14. FIG. 2 is an illustration that focuses on the functions. So, these functions may be implemented variously by hardware only, software only or a combination of hardware and software.

An object data reading unit 40 reads geometry data of an object to be rendered. A rendering processing unit 42 sequentially renders an image frame including the object with a predetermined resolution at a predetermined frame rate. The rendered image frame is stored in a first memory 44 as a buffer. The rendering processing unit 42 renders the image frame at the frame rate equal to or higher than the maximum frame rate of the display 26 planned to be used. The rendering processing unit 42 corresponds to the rendering processor 20 of FIG. 1, for example.

A transfer controller 46 reads out the image frame stored in the first memory 44 then stores in a second memory 48. The second memory 48 stores a plurality of image frames such that time-order between the plural image frames can be identified. For example, the first memory 44 corresponds to the image memory 24 of FIG. 1, and the second memory 48 corresponds to the main memory 14. Alternatively, the second memory may be any storage devices or memory, such as the external storage device 32, provided in the image frame processing device 10. Further alternatively, each of the first memory 44 or the second memory 48 may correspond to different memory area in a physically identical memory.

An interface unit 52 acquires resolution or frame rate information of the display 26 connected to the image frame processing device 10. The interface unit 52 may acquire information of contents such as information indicating whether the image is a still image or moving images, from the main CPU 12 or the rendering program. The interface unit 52 may acquire the resolution or frame rate information of the display from the user via the input device 34. The acquired information is delivered to a postprocessing unit 50. For example, the postprocessing unit 50 may correspond to the main CPU 12 of FIG. 1.

The postprocessing unit 50 includes a merge condition setting unit 54, a frame sequence acquiring unit 56 and a merge execution unit 58. The postprocessing unit 50 performs postprocess to the image frame sequence rendered by the rendering processing unit 42 and stored in the second memory 48 so as to generate images displayable on the display.

Specifically, the merge condition setting unit 54 sets an appropriate merge condition for the image frame sequence based on the information received from the interface unit 52. This process will be described later by referring to FIG. 10. The frame sequence acquiring unit 56 retrieves a sequence of image frames in accordance with the condition set by the merge condition setting unit 54 and delivers the retrieved image frames to the merge execution unit 58. The merge execution unit 58 executes the merge process to the received image frames. The "merge process" herein refers to generation of a single image frame out of a plurality of image frames.

The image frame generated by the merge process by the merge execution unit 56 is output to an image display unit 60 at a frame rate set by the merge condition setting unit 54.

As described above, one feature of the first embodiment is that the "rendering" and the "postprocess" of the image frame sequence are not executed on the same chip but are executed separately. An advantage obtained by separating the rendering and the postprocess is that the dependence on the type of the display connected to the image frame processing device is eliminated.

More specifically, while the interface unit 52 acquires the condition that the image frames output to the display should meet, the rendering processing unit 42 generates an image frame sequence regardless of the condition acquired by the interface unit 52. Subsequently, the postprocessing unit 50 performs a predetermined process to the image frame sequence generated by the rendering processing unit 42 according to the condition acquired by the interface unit 52, to generate an updated image frame sequence for the display. With this, the rendering method in the rendering processing unit 42 need not be changed in accordance with the condition that the image frames should meet. Therefore, the rendering processing unit 42 need only have a general-purpose structure. When the display connected to the image frame processing device 10 is changed to a different type, the change is accommodated by a modification in the process in the postprocessing unit 50. Accordingly, a wider variety of displays can be connected so that a significantly high level of compatibility is ensured. This will eventually reduce the manpower required for development of circuits and software to adapt the processing device to a variety of displays.

In addition, according to the related art, even when the rendering processor has a high rendering capability, the specification of a display often fails to adapt to the rendering capability, requiring that the rendering capability of the rendering processor be limited. According to the first embodiment, however, the capability of the rendering processor need not be limited but can be fully exploited. The postprocess may be arranged so that the capability for rendering at a high frame rate is assigned to the improvement in resolution or so. By ensuring that the postprocess has a high degree of versatility, the flexibility in designing the image frame processing device may be improved. Further, since the display is not tasked to perform an image frame process, the processing load placed on the display may be reduced.

An additional point of consideration is that, when the frame rate in rendering moving images such as an animation video is changed, animation images exhibiting motion different from that intended by an image creator may be displayed on a display. One approach to handle this problem according to the related art is to prepare a plurality of image sequences in consideration of the frame rate of image frames ultimately displayed on the display, so that an optimum viewing experience is enjoyed at any frame rate. In contrast, according to the first embodiment, only one image frame sequence with a high frame rate need to be prepared regardless of the frame rate of the display.

The first memory 44 functions as a frame buffer that stores image frame sequences rendered by the rendering processing unit 42 by one frame. The image frame temporarily stored in the first memory 44 is sequentially transferred to the second memory 48. So, the second memory 48 primarily functions as a work area for the postprocessing unit 50. The first memory 44 functioning as a frame buffer is usually implemented with an EDRAM and the like of which cost is generally high. If the second memory is not provided in this embodiment, the first memory needs to be a large-capacity memory since a maximum of four frames should be stored for the merge process during four frame time as will be discussed later. By providing the second memory 48, the first memory 44 need only have a capacity to store at least one image frame rendered by the rendering processing unit 42. Accordingly, it is advantageous to provide the second memory 48 as a work area for the postprocessing unit 50 apart from the first memory 44. The first memory 44 may be built into the same semiconductor circuit element in which the rendering processing unit 42 is built.

Figure 3:
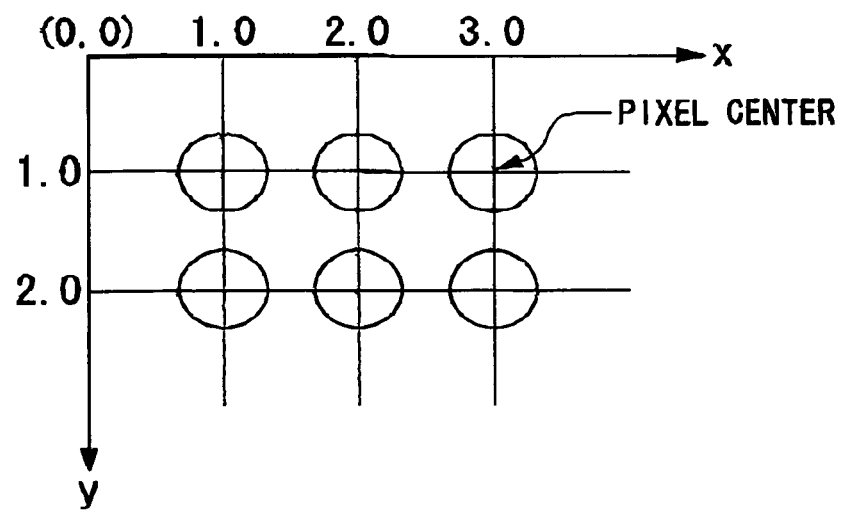
FIG. 3 shows a primitive coordinate system.

FIG. 3 shows a primitive coordinate system in which pixels of each image frame are located in the rendering processing unit 42. The horizontal axis is indicated by x and the vertical axis is indicated by y. A set of pixel coordinates is indicated by (x, y). Each of x and y coordinate values is a fixed-point value represented by 12 bits in the integer part and 4 bits in the decimal part. As illustrated, the centers of each pixel are located at points of integer coordinates in the primitive coordinate system. The rendered image frame is stored pixel by pixel in the first memory. The coordinate system for pointing to a location in the first memory is referred to as a window coordinate system. Memory address calculation is conducted using this coordinate system. The window coordinate system is a coordinate system for pointing to a location within the frame buffer, with a top left point of a rectangular area of the buffer as the origin point.

Given that the primitive coordinate values are (Px, Py) and the offset values are (Offx, Offy), the window coordinate values (Wx, Wy) are given by the following equation.

$$Wx = Px - Offx$$

$$Wy = Py - Offy$$

A description will now be given of several examples for generating an image frame sequence in the post process adapted to various display conditions by the image frame processing device shown in FIG. 2. It is assumed that the rendering processing unit 42 renders an image of 640*480 at a frame rate of 240 frames per second (hereinafter, referred to as fps).

EXAMPLE 1

Figure 4:
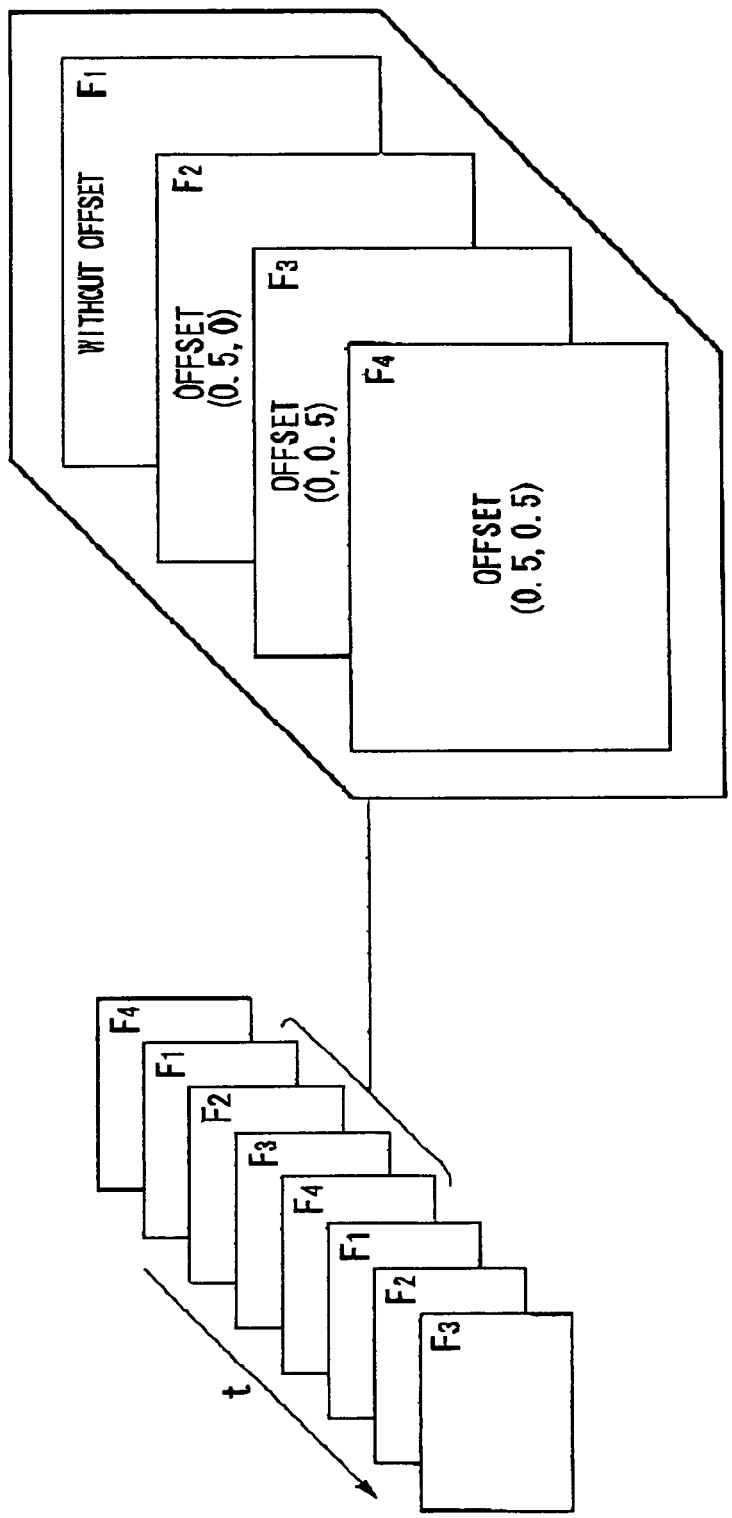
FIG. 4 shows how the offset value is changed at every four frame in image frame sequences output from a rendering processing unit.

FIG. 4 shows how the offset value is changed at every four frame in image frame sequences output from the rendering processing unit 42. For convenience of description, it is assumed that image frames F1, F2, F3 and F4 are generated by rendering in the stated order. The rendering processing unit 42 renders the first image frame F1 without any offset, renders the second image frame F2 with an offset of (0.5, 0), renders the third image frame F3 with an offset of (0, 0.5), and renders the fourth image frame F4 with an offset of (0.5, 0.5). Offsetting in rendering by the rendering processing unit 42 is effected by successively displaced coordinates as a start point of rendering in the rendering space. Hereinafter, such a process will be referred to as a "pixel displacement process".

Figure 5:
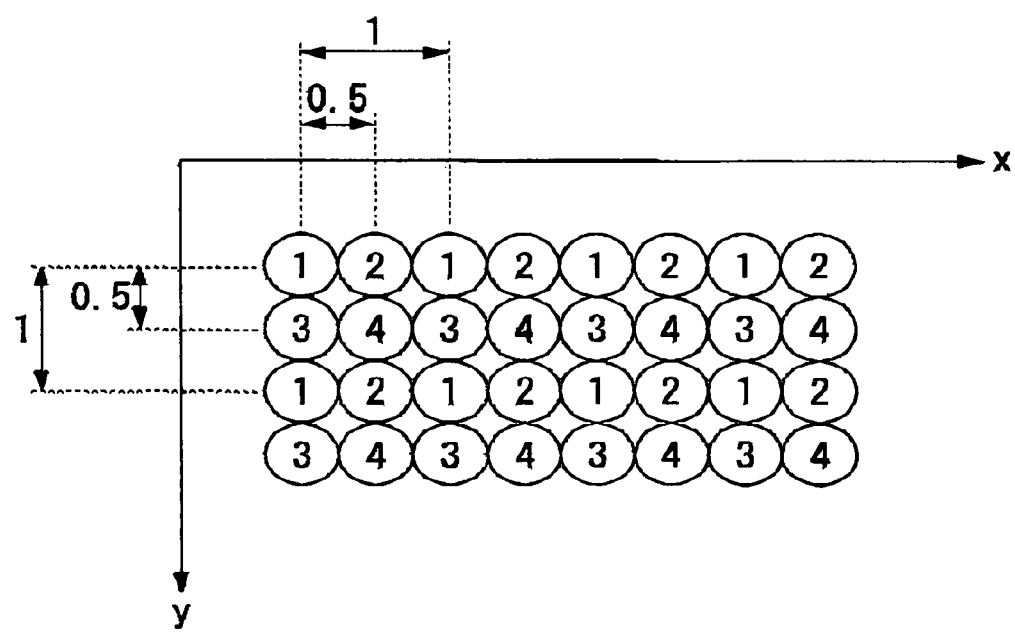
FIG. 5 illustrates point sampling involving four image frames.
Figure 6:
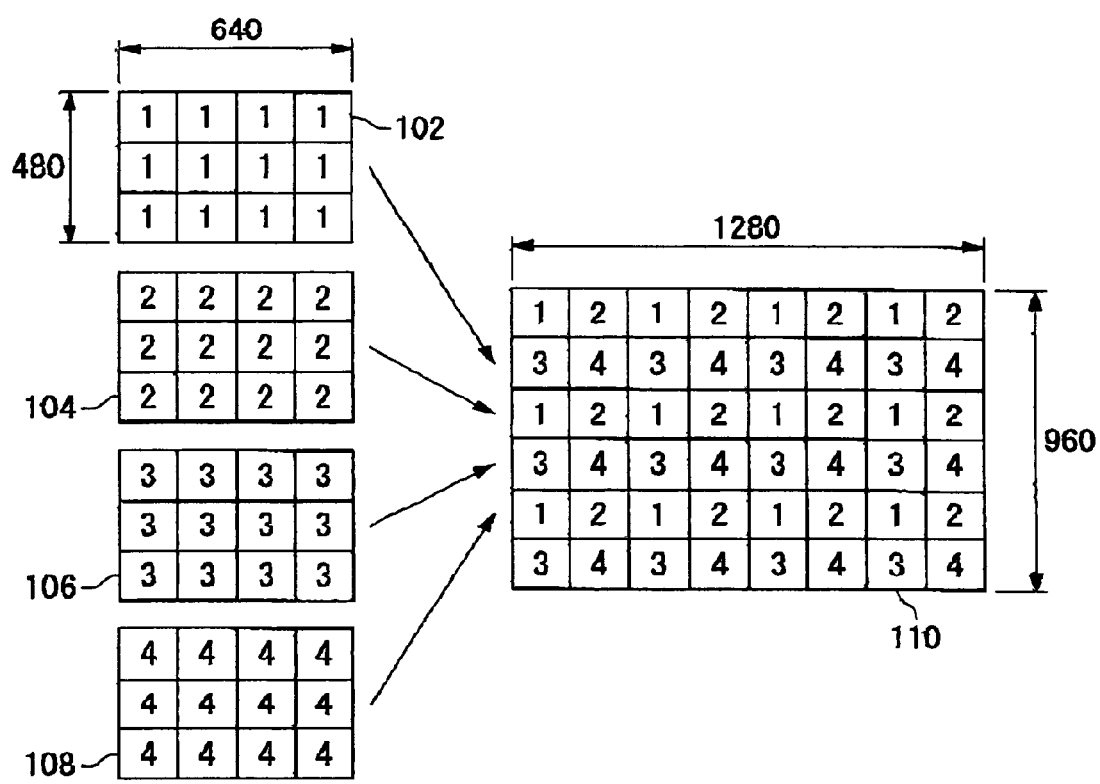
FIG. 6 illustrates generation of an image frame four times the size of original four image frames.

FIG. 5 and FIG. 6 illustrate a first example of the merge process. In this Example 1, a sequence of frames is merged so that an image frame four times the size of the rendered image frame is created.

FIG. 5 is a schematic diagram showing how the pixels rendered by the rendering processing unit 42 with pixel displacements are located in the same window coordinate system. Referring to FIG. 5 and FIG. 6, circles indicated by "1" represent pixels from the first image frame F1, circles indicated by "2" represent pixels from the second image frame F2, circles indicated by "3" represent pixels from the third image frame F3, and circles indicated by "4" represent pixels from the fourth image frame F4. The spacing between the centers of adjacent pixels in each frame is "1" in both the x and y directions. As a result of pixel displacement process by the rendering processing unit 42, the pixels from the image frame F2 are displaced by 0.5 in the x direction with respect to the associated pixels from the image frame F1, the pixels from the image frame F3 are displaced by 0.5 in the y direction with respect to the associated pixels from the image frame F1, and the pixels from the image frame F4 are displaced by 0.5 in the x direction and 0.5 in the y direction with respect to the associated pixels from the image frame F1. Therefore, when the four image frames are located in the same coordinate system, the pixels from respective image frames are at spacing of 0.5 both in the x direction and the y direction, as shown in FIG. 5.

By grid sampling in units of 0.5 pixel in the window coordinate system instead of in units of 1 pixel, an image frame having twice as many pixels in the x direction and in the y direction can be generated. This will be described by referring to FIG. 6. FIG. 6 is a schematic diagram showing how pixels are arranged. While FIG. 6 only shows 4 pixels across and 3 pixels down for the sake of brevity for image frames 102, 104, 106 and 108, there are actually 640 pixels across and 480 pixels down in each frame. The entirety of the pixels are arranged in a relationship illustrated as an image frame 110 in FIG. 6. By arranging the 640×480-pixel image frames 102, 104, 106 and 108 in a grid as mentioned above, the image frame 110 with a size of 1280*960 pixels, four times as large as 640*480 pixel image frame, is created. Hereinafter, such a sampling method is referred to as "point sampling".

According to the Example 1, plural image frames are generated by rendering with spatial displacements in the rendering processing unit 42. Subsequently, the postprocessing unit 50 performs a merge process to the image frames maintaining the displacements between image frames to generate on image frame sequence with a higher spatial resolution than the image frame sequence output from the rendering processing unit 42. The phrase "maintaining the displacements between image frames" means the obtaining of an ultimate image frame by using pixels from the respective offset image frames without any modification. With this, the image frame sequence adapted to different resolutions of different displays can be generated by the postprocessing.

The Example 1 may also be understood as a measure for reducing the frame rate. For example, by generating an image frame from four image frames as shown in FIG. 3, the frame rate will be dropped to ¼. It is advantageous in a situation where the maximum frame rate of the display is lower than the frame rate of the rendering processing unit 42, a low frame-rate, and high-resolution image may be obtained by performing point sampling.

The present embodiment is not limited to generate one image frame from four image frames. Alternatively, by generating an image frame from nine image frames, it is possible to generate an image frame having nine times more pixels than the original image frames. This is equally true when a larger number of image frames are involved. The larger the number of image frames, the lower the frame rate of the ultimately obtained image frame.

EXAMPLE 2

Figure 7:
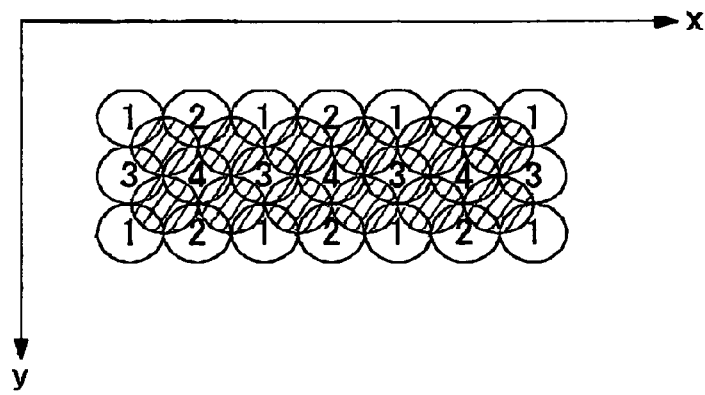
FIG. 7 illustrates motion blur using four image frames.
Figure 8:
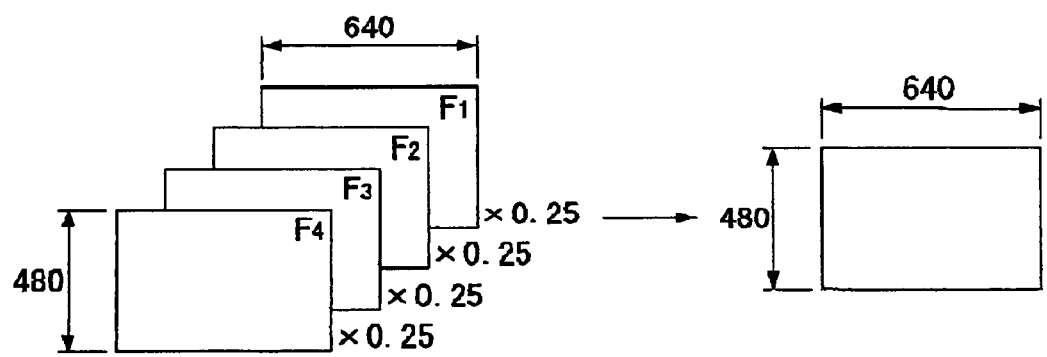
FIG. 8 illustrates four image frames merged to produce an image frame of the same size.

FIGS. 7 and 8 Illustrate a second example of the merge process. In this Example 2, a motion blur effect is achieved by merging consecutive frames.

Referring to FIG. 7, open circles represent pixels from the image frames F1-F4 subjected to the pixel displacement process. In this example, an average RGB value is taken of RGB values of the four adjacent pixels, and then a resultant value is used as a new RGB value. An image frame is generated such that each of the pixels is centered at a midpoint between the centers of four open circle pixels shown as diagonally shaded circles in FIG. 7.

FIG. 8 schematically shows this arrangement. That is, a 680*480 image frame, having RGB values obtained by multiplying 0.25 by the RGB values of the pixels of the 640*480 image frames F1-F4, is generated.

According to the Example 2, plural image frames are generated by rendering with spatial displacements in the rendering processing unit 42. Subsequently, the postprocessing unit 50 performs a merge process to the image frames so as to cancel the displacements between the image frames. As a result, an updated image frame sequence is generated with the same spatial resolution as the image frame sequence output from the rendering processing unit 42. The phrase "cancel the displacements between the image frames" means to ultimately obtain a non-offset image frame by blending offset rendered image frames. In this embodiment, four pixels are blended to generate one pixel. The cancellation of the displacements between the image frames is substantially equivalent to generate images obtained by dividing a time frame between two temporally successive image frames and to use an averaged image of divided images as an image of a target frame. Therefore, if the contents of image frame sequence rendered by the rendering processing unit are moving images, the cancellation of the displacements can apply the effect of motion blur to the moving images. As well as the Example 1, the Example 2 may be understood as a measure of reducing the frame rate. More specifically, the Example 2 makes it possible to output an image frame sequence having a frame rate ¼ that of the frame rate of the rendering processing unit 42, while maintaining the resolution of the original image frames.

The Example 2 may also be used when the content is a still image. In this case, the antialiasing effect is applied to a still image obtained by the merge process. In this case, the merge process is similar to "super sampling" in which an original pixel is divided into subpixels in order to obtain data for a target pixel in an image, and in which averaged data taken in the subpixels are used as pixel data.

EXAMPLE 3

Figure 9:
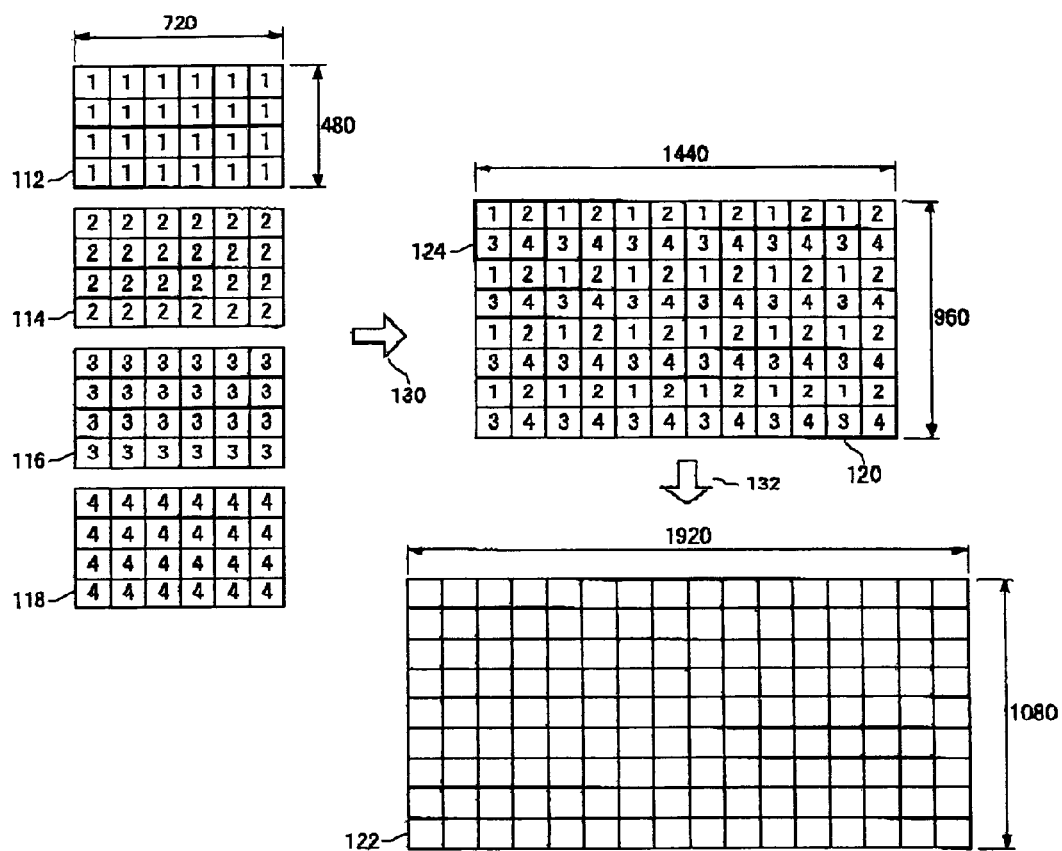
FIG. 9 illustrates generation of an enlarged image by performing point sampling on four image frames and subsequent bilinear interpolation.

FIG. 9 illustrates a merge process according to Example 3. In the Example 3, an image frame is generated with a horizontal to vertical ratio different from that of the original image frame generated by the rendering processing unit 42. For example, it is assumed that the rendering processing unit 42 generates a first image frame 112, a second image frame 114, a third image frame 116 and a fourth image frame 118 each having a resolution of 720*480 pixels, and that a target image frame 122 is generated from image frames 112-118 having a resolution of 1920*1080 pixels, which is a different vertical to horizontal ratio from that of the original image frames 112-118. Referring to FIG. 9, numerals "1", "2", "3" and "4" indicate that the associated pixels are pixels from the first image frame 112, the second image frame 114, the third image frame 116 and the fourth image frame 118, respectively.

In a first step 130, point sampling described in the Example 1 is performed. With this, an image frame 120 of 1440*960 pixels, i.e. four times the size of each of the original image frames 112-118 is generated. Subsequently, bilinear sampling is performed in a second step 132 so as to generate an image frame 122 with a resolution of 1920*1080 pixels. Bilinear sampling is one method of image interpolation. In this example, a pixel color to be rendered is determined by linear interpolation of RGB values of the surrounding four pixels.

Figure 10:
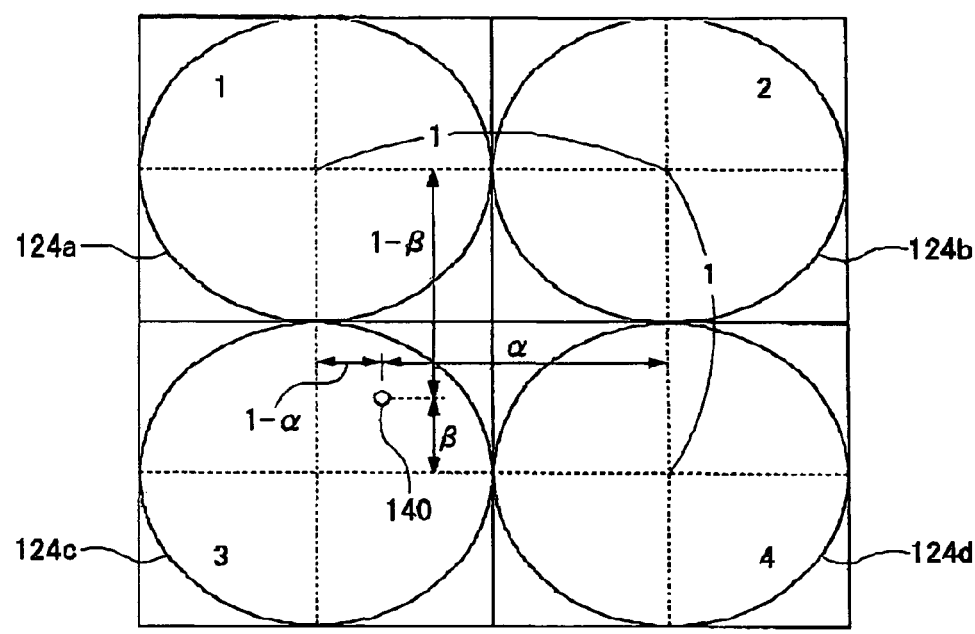
FIG. 10 illustrates bilinear sampling.

A description of bilinear sampling will be given by referring to FIG. 10. Suppose that the image frame 122 (1920*1080) is scaled down to the image frame 120 (1440*960), coordinates of the pixel centers in the image frame 122 in the coordinate system of the image frame 120 are calculated. FIG. 10 shows a part 124 of the image frame 120 of FIG. 9. An open circle 140 represents the center of a pixel in the image frame 122. In order to determine a color to be used in rendering the pixel at these coordinates, RGB values are subject to linear interpolation in accordance with the coordinate displacements from the centers of the pixels 124a, 124b, 124c and 124d of FIG. 10. It should be noted-that the pixel 124a is a pixel from the first image frame 112 of FIG. 9, the pixel 124b is a pixel from the second image frame 114, the pixel 124c is a pixel from the third image frame 116, and the pixel 124d is a pixel from the fourth image frame 118. Given that the displacements in the horizontal direction from the centers of the four pixels 124a-124d is α and the displacement in the vertical direction is β (see FIG. 10), the RGB values of the open circle 140 as computed by linear interpolation are given by the following equations.

$$R=(1-\alpha)(1-\beta)Rs1+\alpha(1-\beta)Rs2+(1-\alpha)\beta Rs3+\alpha\beta Rs4 \quad (1)$$

$$G=(1-\alpha)(1-\beta)Gs1+\alpha(1-\beta)Gs2+(1-\alpha)\beta Gs3+\alpha\beta Gs4 \quad (2)$$

$$B=(1-\alpha)(1-\beta)Bs1+\alpha(1-\beta)Bs2+(1-\alpha)\beta Bs3+\alpha\beta Bs4 \quad (3)$$

where Rs, Gs and Bs represent RGB values of the four pixels 124a-124d, and suffixes s1, s2, s3 and s4 represent components of the pixels 124a, 124b, 124c and 124d, respectively. By computing the equations (1)-(3) for all the pixels included in the image frame 122 to determine colors, the image frame 122 is generated.

The equations (1) through (3) are based on the same concept as the computation of general bilinear sampling. A difference from the general bilinear sampling is that the color components are acquired from pixels of different image frames.

When the resolution of the image frame sequence rendered by the rendering processing unit 42 and the resolution displayed on the display are not in a relation where one is an integral multiple of the other, i.e. when, for example, the image frame rendered is 720*480, and the resolution of the image frame displayed on the display is 1920*1080, the target resolution cannot be obtained merely by executing a pixel displacement process and point sampling. In this case, an intermediate image frame of 1440*960 is generated by the pixel displacement process and point sampling, and then bilinear sampling is subsequently executed so as to obtain an image frame of 1920*1080. With this, the frame rate is dropped to 1/(number of image frames used in point-sampling).

The pixel displacement process may not have to be executed. More specifically, the bilinear sampling may be directly performed on the original image frame rendered by the rendering processing unit 42 to obtain an ultimate image frame. However, by performing the pixel displacement process and point sampling in advance of the bilinear sampling, it is possible to obtain an image exhibiting less deterioration when enlarged. Alternatively, each of four image frames (for example, of a size 720*480) of an image frame sequence may be enlarged to the image frame adapted to the display (for example, 1920*1080), whereupon the four enlarged image frames may be blended to obtain an ultimate image frame.

Figure 11:
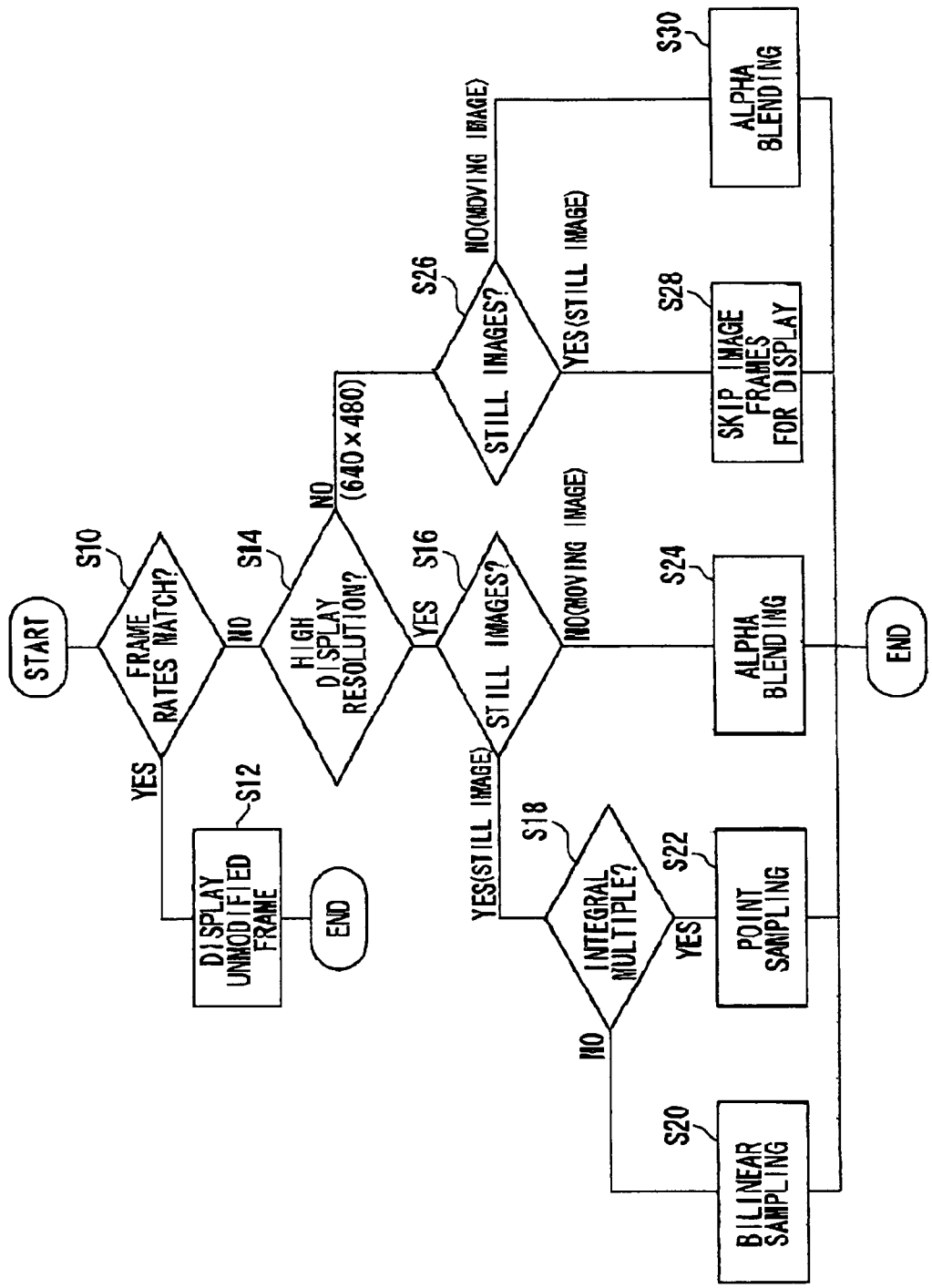
FIG. 11 is a flowchart for a determination of a merge method in a merge condition setting unit.

The user may be given a chance to select one of the Examples 1 through 3 above. In one approach of practicing the embodiment, the image frame processing device may make this determination automatically. FIG. 11 is a flowchart for an automatic determination performed by the merge condition setting unit 54. In this flow chart, a determination is made as to which of the postprocesses described in the Examples 1 through 3 is performed on the image frame sequence rendered by the rendering processing unit 42, in accordance with the frame rate, resolution and contents.

The merge condition setting unit 54 compares the frame rate information of the display acquired via the interface unit 52 with the frame rate of the image frame rendered by the rendering processing unit 42 to determine whether these frame rates match (S10). When the frame rates match (Yes in S10), the transfer controller 46 transfers the image frame from the first memory 44 to the second memory 48. The frame sequence acquiring unit 56 reads out from the second memory 48 the image frame with a time interval same with the frame rate of the rendering processing unit 42. The merge execution unit 58 outputs the image frame to the image display unit 60 without performing ant postprocesses such as a merge process (S12). With this, the rendering performance of the rendering processing unit 42 can be fully exploited and the image can be rendered with a full-spec frame rate. In an alternative approach, the image frame sequence may be output without being temporarily stored in the second memory 48. More specifically, the frame sequence acquiring unit 56 directly reads out the image frame sequence rendered by the rendering processing unit 42, using the first memory 44 as a buffer, and outputs the image frames to the image display unit 60.

When the frame rates do not match (No in S10), the merge condition setting unit 54 compares the resolution of the image frame rendered by the rendering processing unit 42 (hereinafter, referred to as the "rendered image frame") with the resolution information of the display acquired via the interface unit 52 to determine whether the resolutions match or not (S14). If the resolution of the display is higher than the resolution of the rendered image frame (Yes in S14), the merge condition setting unit 54 determines whether the contents of images displayed on the display is a still image or moving images (S16). This determination may be made by reading information registered in a header or the like of the program. Alternatively, a determination on a still image or moving images may be made based on the magnitude of motion components, which are differences of adjacent image frames, computed by a motion determination unit (not shown). If the contents is a still image such as a screen image of a word processor document or an HTML document (Yes in S16), the merge condition setting unit 54 further determines whether the resolution of the display is an integral multiple of the resolution of the rendered image (S18). A determination of "integral multiple" is made when both the vertical and horizontal pixel counts of one of the compared resolutions are multiples of the same integral of those of the other resolution, i.e. when, for example, the rendered image frame is 640*480 and the resolution of the display is 1280*960 or 1920*1440. When the resolution of the display is an integral multiple of the resolution of the rendered image frame (Yes in S18), the Example 1 described with reference to FIGS. 5 and 6 is performed to obtain an image frame sequence of a desired resolution (S22). Therefore, when the resolution of the display is twice as high, the merge condition setting unit 54 directs the frame sequence acquiring unit 56 to retrieve four image frames. When the resolution of the display is three times as high, the merge condition setting unit 54 directs the frame sequence acquiring unit 56 to retrieve nine image frames. The frame sequence acquiring unit 56 delivers the acquired image frames to the merge execution unit 58, whereupon the merge execution unit 58 executes point sampling on the delivered image frames to output the image frame with a desired resolution to the image display unit 60.

When it is determined in S18 that the resolution of the display is not an integral multiple of the rendered image frame (No in S18), the Example 3 described with reference to FIGS. 9 and 10 is executed so as to obtain an image frame sequence of a desired resolution (S20). More specifically, the merge condition setting unit 54 generates an image frame of a resolution that is an integral multiple of the resolution of the rendered image frame and is closest to the desired resolution. By executing bilinear sampling on the generated image frame, the merge condition setting unit 54 further generates an image in which the horizontal to vertical ratio is not maintained.

When it is determined in S16 that the content is moving images such as motion CG or a movie (No in S16), the merge condition setting unit 54 executes the Example 2 described with reference to FIGS. 7 and 8 so as to obtain moving images with motion blur effect (S24). More specifically, the merge condition setting unit 54 executes a merge process by using the number of image frames determined by (frame rate of rendered image frame)/(frame rate of display). For example, when the frame rate of the rendered image frame is 240 fps and the frame rate of the display is 60 fps, 4 (=240/60) frames are used for a merge process. If the result of this division is not an integer, for example, when the frame rate of the rendered image is 240 fps and the frame rate of the display is 70 fps, the division results is 3.4 (=240/70). In this case, the fractional portion is dropped, and a merge process is executed on three image frames to output the resultant image frame at 70 fps.

In any of the cases, the frame rate of the image frame sequence output from the postprocessing unit 50 is lower than the frame rate of the rendered image frame produced by the rendering processing unit 42. For example, the frame rate is dropped to ¼ by executing point sampling to produce a resolution twice as high, and the frame rate is dropped to ⅑ by executing point sampling to produce resolution three times as high. Accordingly, even when a desired resolution is obtained as a result of the process of S20 or S22, there may be produced a flicker or the like on the screen due to low frame rate. In an alternative approach, there may be provided a user prompt unit (not shown) that alerts on a screen the user that the frame rate will be dropped significantly when the desired resolution is obtained and prompts the user for acceptance. When the user accepts, point sampling will be executed. When not, point sampling is not executed. In still another approach, the merge condition setting unit 54 may refer to the specification (resolutions and frame rate) of the display and the postprocesses that can be performed in the postprocessing unit 50, and then display on a screen a list of possible pairs of resolutions and frame rates. The user prompt unit (not shown) may prompt the user for a selection of a desired pair and transmits the selected pair to the merge condition setting unit 54. In response to this, the merge condition setting unit 54 then directs the frame sequence acquiring unit 56 and the merge execution unit 58.

The aforementioned processes may be performed before the display of rendered image frame. Alternatively, image frames subjected to the merge process may be displayed according to a predetermined algorithm so that the user viewing the displayed result can decide whether to proceed aforementioned process according to the user's taste.

Referring back to S14, when the resolution of the display is equal to or lower than the resolution of the rendered image frame (No in S14), the merge condition setting unit 54 determines whether the content is a still image (S26). When the contents are still images (Yes in S26), the merge condition setting unit 54 skips some image frames for display (S28). More specifically, the merge condition setting unit 54 directs the frame sequence acquiring unit 56 to acquire one image frame out of a specific number of rendered image frames. The merge execution unit 58 outputs the image frames to the image display unit 60 without subjecting them to the postprocess. For example, when the frame rate of the rendered image frame is 240 fps and the frame rate of the display is 60 fps, every fourth image frame is output.

When it is determined in S26 that the content is moving images (No in S26), the Example 2 is executed as described above to obtain motion blurred moving images (S30).

Thus, the merge condition setting unit 54 is capable of automatically determining the condition for the postprocess, by comparing the frame rate or resolution of the image frame sequence rendered by the rendering processing unit 42 with the frame rate or resolution of the display connected to the image frame processing device.

As described above, the rendering processing unit is allowed to perform rendering at a predetermined frame rate to generate an image frame sequence regardless of the condition to be met by the image frame for output to the display. The postprocessing unit then performs a predetermined process to the image frame sequence generated by the rendering process and outputs the updated image frame sequence that conforms to the aforementioned condition.

Since the rendering process and the postprocess are executed separately, it is possible to perform rendering at a predetermined frame rate to generate an image frame sequence regardless of the specification of the display, such as the resolution or frame rate.

The rendering processing unit 42 is described as rendering a 640*480 pixel image at 240 fps. Image frames of other pixel counts may be rendered. The rendering speed of image frames may also be lower or higher. For example, the image frame sequence may be rendered at 300 fps. In this case, the image frame sequence may be generated to be adapted to both a 50 Hz display and a 60 Hz display.

In describing the embodiment above, a merge process is described as being performed on pixels from four image frames. Alternatively, a merge process may be performed on a larger number of pixels. For example, six image frames may be rendered with pixel displacements such that pixels from respective frames are located at corresponding vertices of a hexagon and an image frame is generated formed of pixels with an averaged RGB value of the six pixels.

In describing the embodiment above, the image frame processing device is described as being built into the entertainment apparatus for rendering CG images. However, the image frame processing technology according to the present invention may also be applied to a DVD player, a personal computer, a digital video camera and the like.

Second Embodiment

In the first embodiment, image frames more than image frames needed for displaying moving images on a display are rendered. Then, predetermined process is executed on the rendered image frames to output image frames for displaying. In contrast, such embodiment also be envisaged that, when moving images are provided beforehand, a plurality of image frames are picked up from the moving images and are subjected to a predetermined process, and then image frames less than read-out image frames are output. By latter embodiment, fast-forwarded picture of original moving images can be created. In addition, fast rewinding moving images can also be created. The rewound moving images are images output reversely in time axis in regard to moving images. Hereinafter, "fast-forwarding" includes fast-rewinding action.

These two embodiments seem to be different at first glance. However, the two embodiments have same concept in that image frames more than frames finally presented to users are subjected to predetermined process and then updated image frames are output. In other words, the difference between the two embodiments is only the length of intervals for outputting image frames.

Recently, digital moving image recorder such as HDD (Hard Disk Drive) video recording apparatus becomes widespread. Therefore, large amount of moving image data can be personally created, recorded or played easily. In such apparatus, a user uses fast-forwarding function for searching interesting part of recorded moving image data. However, when moving images are fast-forwarded, the user often misses the interesting part during searching and sometimes feels inconvenient for searching.

Thus, in this second embodiment, image frame processing technology will be provided for outputting easy-to-watching moving images even when the moving images are fast-forwarded.

Figure 12:
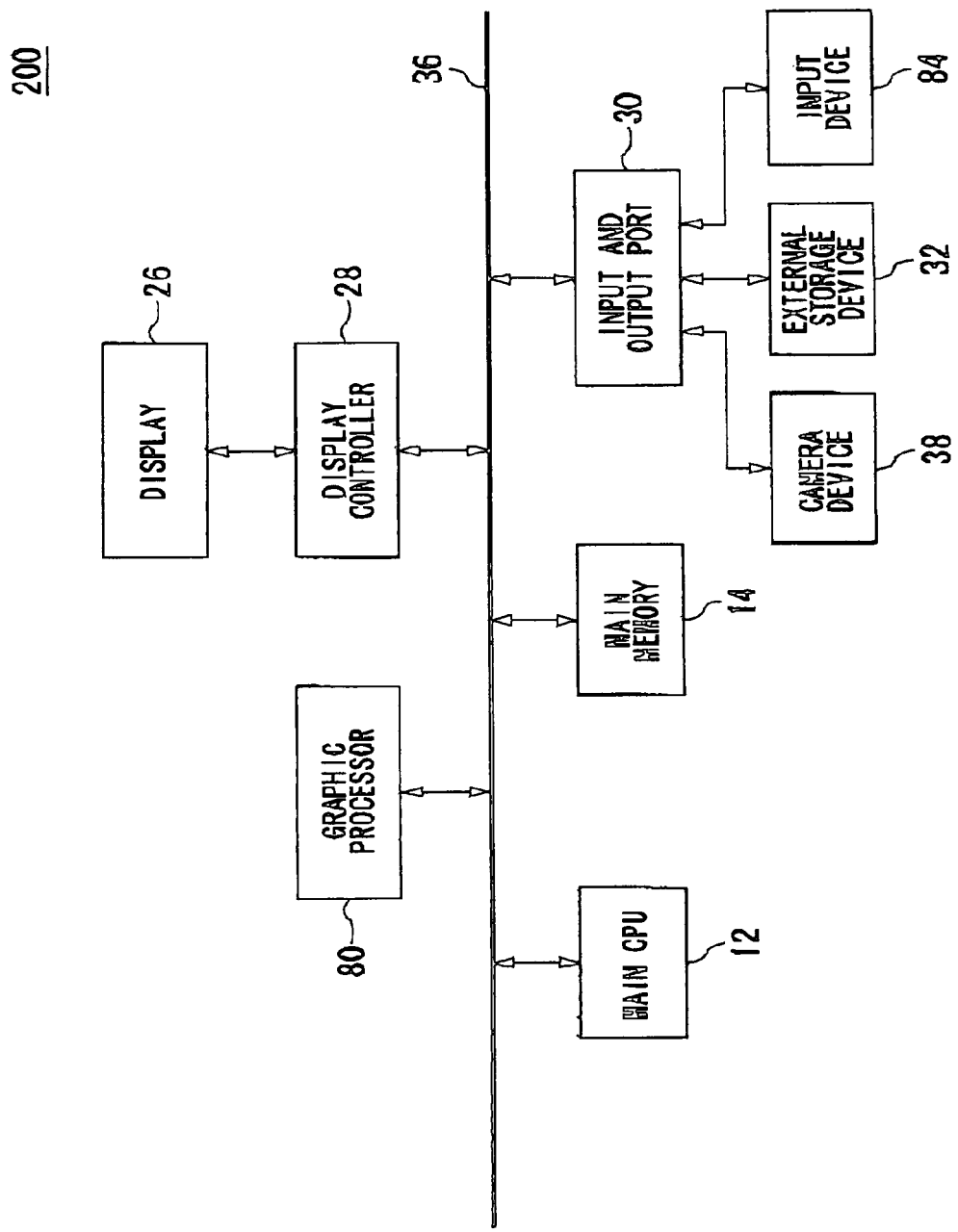
FIG. 12 shows a hardware configuration of the image frame processing device 200 according to the second embodiment of the invention.

FIG. 12 shows hardware configuration of an image frame processing device 200 according to the second embodiment. Main CPU 12, main memory 14, display 26, display controller 28, input and output (I/O) port 30 and external storage device 32 are same as blocks shown in FIG. 1 according to the first embodiment, so same numerals are allotted to these blocks and further explanation for these blocks are omitted. To the input and output port 30, camera device 38 such as digital video camera is connected. Moving images captured by the camera device 38 are stored as digital data in the external storage device 32 such as a DVD (Digital Versatile Disc) drive and a hard disk drive. Graphic processor 80 picks out an image frame sequence from the moving image data stored in the external storage device 32 and then stored it in the main memory 14. Then, the graphic processor 80 performs predetermined process to the image frame sequence to create an updated image frame sequences, and output the updated sequence to the display 26.

The image frame processing device 200 may be incorporated in various kinds of moving image displaying apparatus which displays moving images composed of image frame sequence on the display 26. Such moving image displaying apparatus may include various apparatus for storing or playing movie contents such as a DVD player and an HDD video recorder. In addition, the moving image displaying apparatus also may be incorporated in a personal computer, a digital video camera, or an entertainment apparatus.

The input device 84 produces some inputs to the image frame processing device 200. As the input device 84, various types of devices may be used according to the type of the moving image displaying apparatus. For example, suppose that the moving image displaying apparatus is a DVD player or HDD video recorder, the input device 84 may be various buttons provided on a remote controller or on the moving image displaying apparatus. Suppose that the moving image displaying apparatus is a general-purpose computer, the input device 84 may be a keyboard or a mouse.

In this second embodiment, it will be described that fast-forwarding images are created when fast-forwarding request is received from the user for movie contents created beforehand and recorded in a large amount storage device such as a DVD drive or an HDD drive. As well as the first embodiment, the second embodiment may be applied to the entertainment apparatus which performs rendering process for creating new image frame sequence for displaying on the display.

Now, in the image frame processing device 200 shown in FIG. 12, a method for creating value-added fast-forwarding moving images will be described with reference to some examples.

EXAMPLE 4

Figure 13:
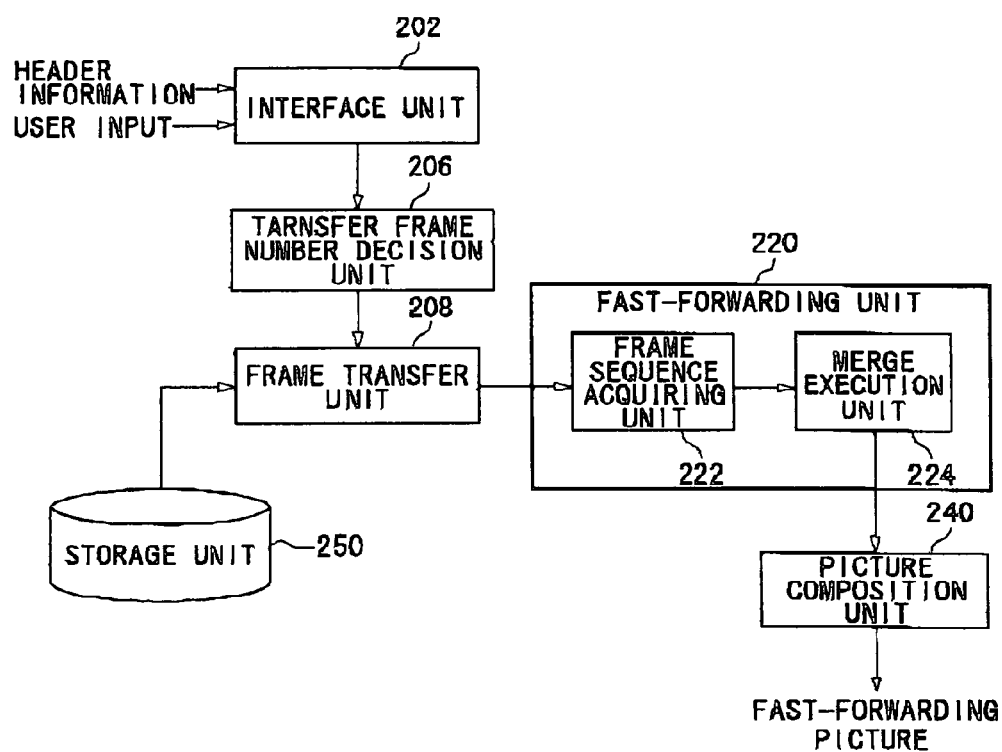
FIG. 13 is a functional block diagram of the image frame processing device according to Example 4.

FIG. 13 is a functional block diagram of the image frame processing device 200 according to Example 4. The features of FIG. 13 may be implemented mainly with the graphic processor 80, the main CPU 12 and the main memory 14. In this Example 4, a method for providing fast-forwarding smoothly-moving images in response to the fast-forwarding request from the user.

An interface unit 202 acquires a fast-forwarding request via the input device 84 by a user. For example, suppose the image frame processing device 200 is incorporated in a DVD player, this fast-forwarding request corresponds to the fast-forwarding speed information such as "double speed" "4× (four-times) speed" specified with a forwarding button or dial provided on the main body or a remote controller. The fast-forwarding request may be specified in header part of moving image data instead of given from the user. The interface unit 202 sends the acquired information to a transfer frame number decision unit 206. The transfer frame number decision unit 206 determines the number of the image frames necessary to realize fast-forwarding moving images at the received fast-forwarding speed information. A frame transfer unit 208 reads out determined number of image frames, which is determined by the transfer frame number decision unit 206, from the image frame sequence stored in the storage unit 250 at a constant timing. Then the frame transfer unit 208 transfers the frames to a fast-forwarding unit 220. As an example, the storage unit 250 corresponds to the main memory 14 in FIG. 12. However, the storage unit 250 may be any storage unit or memory provided in the image frame processing device 200 such as the external storage device 32. In addition, image frames in the storage unit 250 may be images with no compression. The image frames in the storage unit 250 also may be compressed images using DCT (Discrete Cosine Transformation).

The fast-forwarding unit 220 includes frame sequence acquiring unit 222 and merge execution unit 224. The frame sequence acquiring unit 222 acquires the transferred image frames, and stores them temporarily. The merge execution unit 224 performs merge process which generates one updated image frame from the plural image frame stored in the frame sequence acquiring unit 222. This merge process may be blending process described in the first embodiment. The updated image frame is referred to as "a fast-forwarding frame".

The fast-forwarding frame generated by the merge execution unit 224 is transferred to a picture composition unit 240 in generated order. The picture composition unit 240 outputs the fast-forwarding frames at the predetermined frame rate that can be displayed on the display 26. With this, the user can watch a desired fast-forwarding picture on the display 26.

When the merge process is executed on plural image frames, a pseudo afterimage is generated in the fast-forwarding frame. By outputting such fast-forwarding frames sequentially, fast-forwarding picture having motion blur effect may be acquired. So, the user can enjoy natural and smoothly moving picture.

By the way, such process may be done that image frames are extracted from the image frame sequence in the storage unit 250 by every predetermined number of frames, and then output extracted frames at a predetermined frame rate without giving any merging process for creating fast-forwarding picture. Now, to understand the advantage of the Example 4, it will be described with reference to FIG. 14 in that the disadvantage point of the fast-forwarding picture created as such process.

Figure 14:
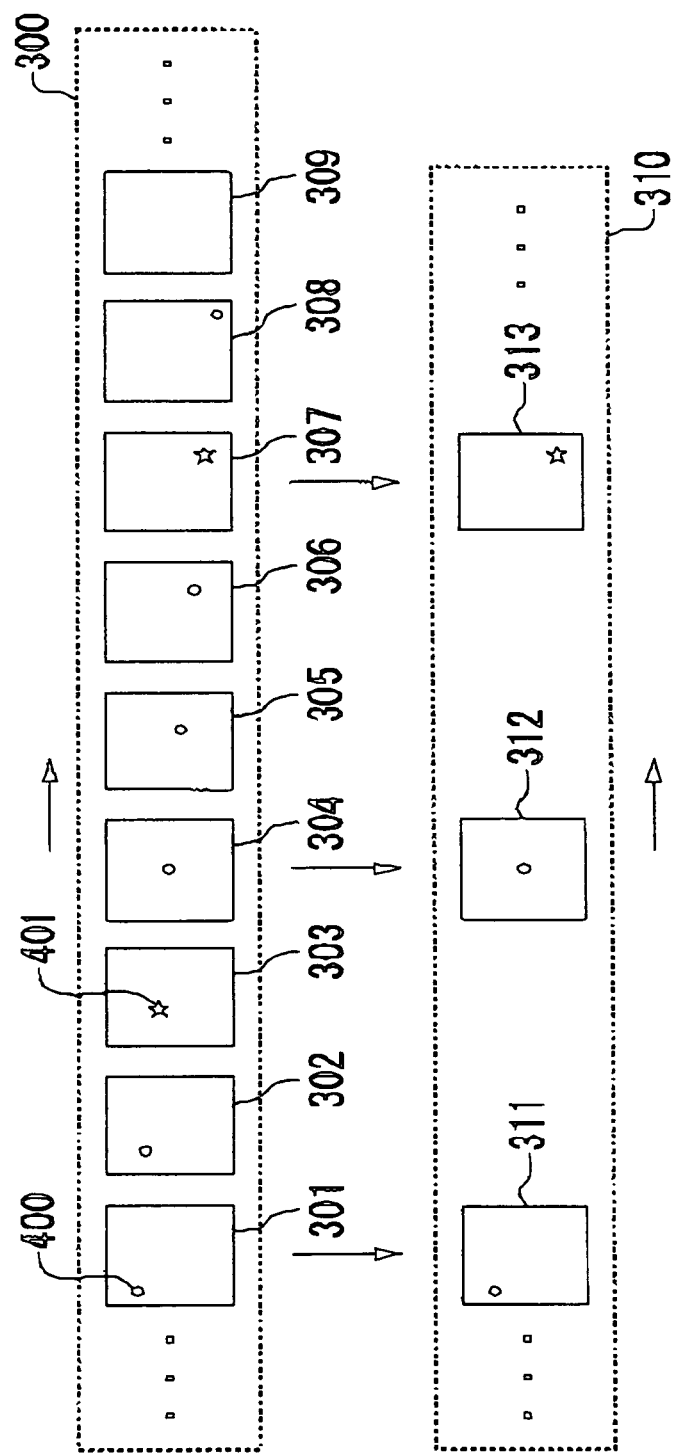
FIG. 14 shows the concept of the process for extracting image frames from the image frame sequence and creating the fast-forwarding frame.

FIG. 14 shows a concept off the process including the step of extracting appropriate number of image frames from the image frame sequence 300 prepared beforehand, and creating a fast-forwarding frame sequence 310.

The image frame sequence 300 includes image frames 301-309 and a lot of other image frames ranging before and behind these frames. The image frames 301-309 represent the moving images that a circular object 400 moves from upper left to lower right in the screen. Actually, it is not possible to move the circular object 400 smoothly unless much more image frames are used than frames 301-309. However, to simplify the explanation in FIG. 14, it is supposed that a smooth moving of the circular object 400 is realized only with the image frames 301-309.

Star-shape 401 shown in the image frame 303 and 307 represents the flickering of the circular object 400. In the image frame sequence 300, the circular object 400 appears on upper left corner of the screen and moves to the lower right corner with twice flickering.

In this example, one image frame is extracted from every three image frames. More particularly, image frames 301, 304 and 307 are extracted every three image frames in the image frame sequence 300. Then, these extracted image frames becomes fast-forwarding frames 311, 312, 313 respectively without taking any process. Thus, fast-forwarding picture may be created by extracting one image frame from every appropriate number of image frames to create fast-forwarding frame sequence 310, and outputting the sequence 310 at predetermined frame rate. In this example shown in FIG. 14, the 3× fast-forwarding picture can be acquired.

However, with such process, when difference between image frames extracted from an original image frame sequence is large, the picture might be frame-by-frame advance especially in rapid fast-forwarding. Thus, the picture becomes poor one for the user. Additionally, the image frame sequence 300 includes the image frame 303 representing that the circular object 400 flickers. However, the fast-forwarding frame sequence 310 does not include this image frame 303. Therefore, the user who watched the fast-forwarding picture consisting of the frame sequence 310 can not recognize that the circular object 400 flickers twice.

As can be seen from this, in such process, it is possible that the image frame having important information would not be included in the fast-forwarding picture except from the flickering of the object in FIG. 14. In other words, though some event occurred in the original image frame sequence, it is possible that the user can not watch the event when watching the fast-forwarding picture. So, when the user searches interesting scene from the fast-forwarding picture with particular information as a clue, the user can not find out that scene if the particular information is lacked from the fast-forwarding picture.

Figure 15:
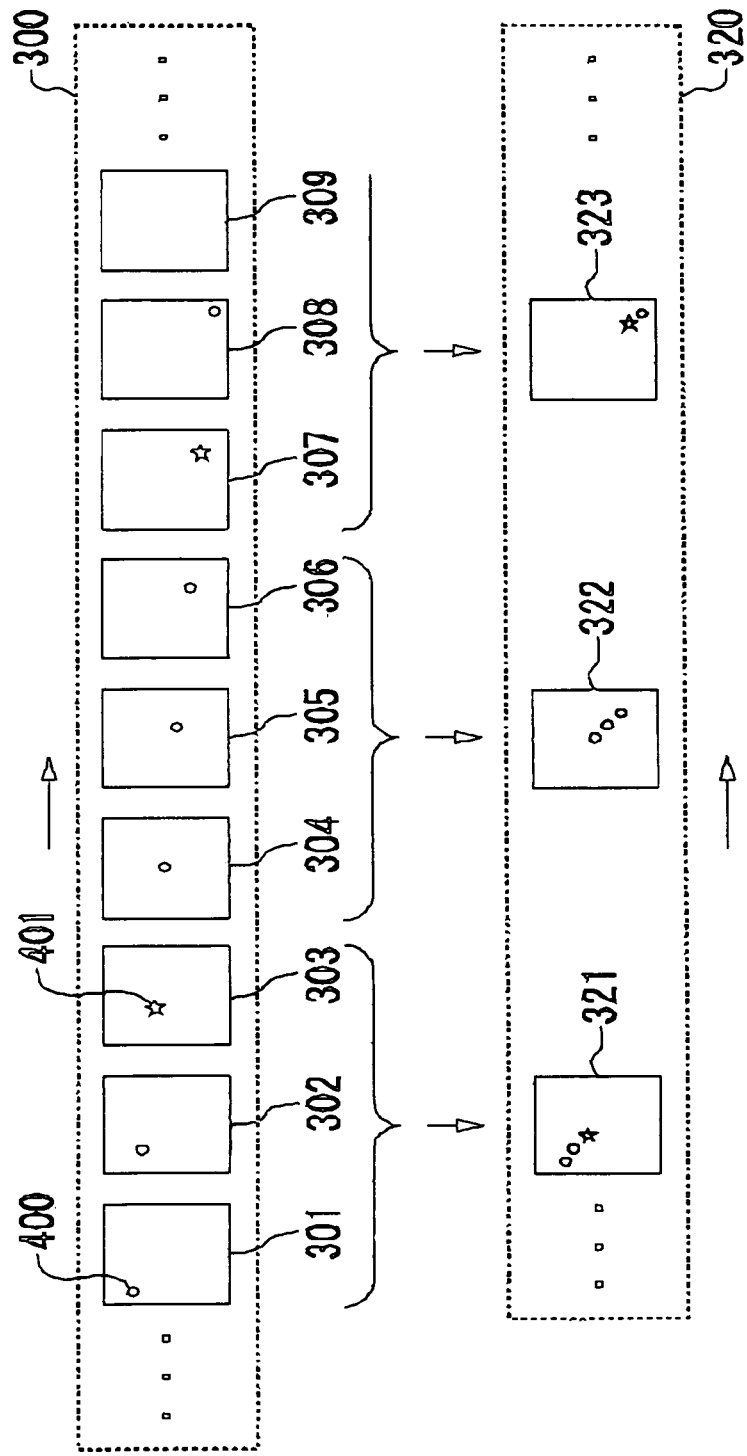
FIG. 15 shows the concept of the process for merging plural image frames to create the fast-forwarding frames.

Next, a method for creating fast-forwarding picture will be described according to the Example 4 with reference to FIG. 15. Instead of extracting one image frame every three image frames, the merge execution unit 224 executes the merging process to three image frames in image frame sequence 300 to create one fast-forwarding frame. More particularly, the merge execution unit 224 executes merge process to image frames 301-303 to create fast-forwarding frame 321. The merge execution unit 224 executes merge process to image frames 304-306 to create fast-forwarding frame 322. The merge execution unit 224 executes merge process to image frames 307-309 to create fast-forwarding frame 323.

This merge process corresponds to creating an image frame having pixels each of which is weighed averaged pixels positioned at same position in image frames. More particularly, when n pieces of image frames $F_m$ (m-1, ..., n, n as integer positive) are used to create one fast-forwarding frame $F_f$, $$F_f = \Sigma \, \alpha_m / F_m \qquad (4)$$

where $\alpha_m$ represents the weighing coefficient for each image frame and satisfies $\Sigma \, \alpha_m - 1$. As can be seen from an expression (4), the weighing ratio maybe not equal to each image frame. For example, high weighing ratio may be applied to image frames adjacent to certain image frame and, further the image frame positions from certain image frame, lower the weighing ratio may be applied. How to distribute the value of $\alpha_m$ depends on a characteristic of fast-forwarding frame $F_f$.

By the merge process described above, fast-forwarding frame 321, 322, 323 are acquired having pseudo afterimage of the circular object 400 moving between image frames. In FIG. 15, the afterimage of the circular object 400 is represented as an open circle or star-shape. With this, when the fast-forwarding frame sequence 320 having fast-forwarding frames 321-323 is reproduced, motion blurred and smoothly moving picture can be acquired. Therefore, eyestrain of the user may be alleviated. In addition, as can be seen from the fast-forwarding frames 321 and 323, object flickering image is remained in those frames as pseudo afterimage. So, information in the original image frames may not be lost from the frame due to creating the fast-forwarding frame. In other words, part of information of the original image frame is always left in the fast-forwarding frame. Thus, when the user searches his interesting scene from the fast-forwarding picture with particular information as a clue, the user feels easy to find out that scene because of the residual information.

Figure 16:
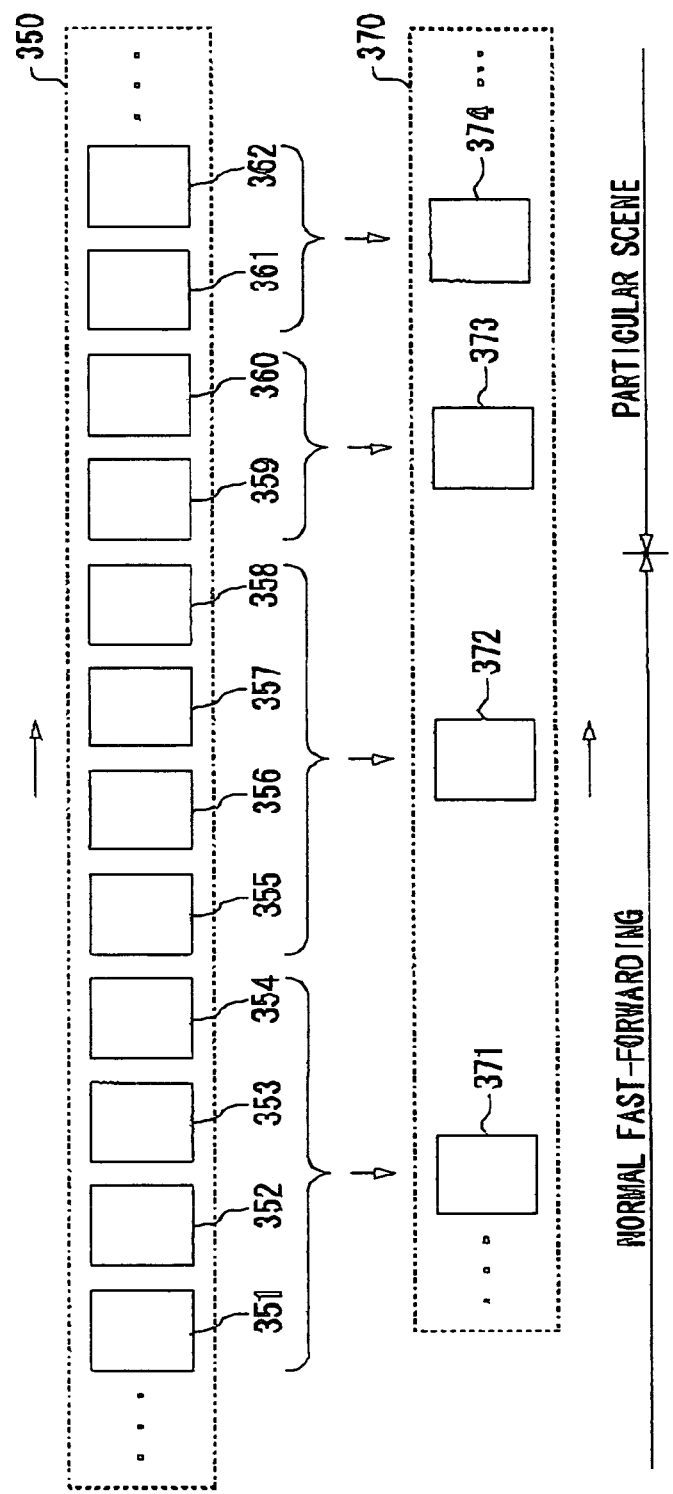
FIG. 16 shows the concept of the process for decreasing the number of the image frames being merged and creating the fast-forwarding picture with reduced forwarding speed.

FIG. 16 shows the concept of the process of increasing or decreasing the number of image frames for being merged to create the fast-forwarding picture having different forwarding speed. An image frame sequence 350 includes image frames 351-362 and a lot of image frames ranging before or after those frames. When creating normal fast-forwarding picture, the merge execution unit 224 executes merging process to four image frames to create one fast-forwarding frame. More particularly, the merge execution unit 224 executes merge process to image frames 351-354 to create a fast-forwarding frame 371, and the merge execution unit 224 executes merge process to image frames 355-358 to create a fast-forwarding frame 372.

When particular image frame having particular condition is detected by the frame sequence acquiring unit 222 during creating fast-forwarding frames, the merge execution unit 224 executes the merge process to every two image frames to create one fast-forwarding frame. In FIG. 16, when the image frame 359 satisfies the particular condition, the merge execution unit 224 executes the merge process to the image frames 359 and 360 to create a fast-forwarding frame 373, and the merge execution unit 224 executes the merge process to the image frames 361 and 362 to create a fast-forwarding frame 374.

The fast-forwarding picture comprised of fast-forwarding frame sequence 370 including fast-forwarding frames 371-374 has 4× forwarding speed at first, but after the fast-forwarding frame 373, the forwarding speed decreases to double. Thus, by appropriately increasing or decreasing the number of image frames being merged, the fast-forwarding picture of which speed changes at any time point may be acquired.

To detect particular image frame, any well-known technique may be used. For example, using a scene change detection technique, particular image frame can be done where scenes are changed. As this, the fast-forwarding picture can be acquired which has reduced forwarding speed at any particular scene. Alternatively, motion vectors between image frames are calculated, and then the particular image frame can be detected which has absolute value of the motion vectors larger than the predetermined value. With this, by detecting the image frame where movement of the object in the screen becomes larger, the fast-forwarding picture which has reduced forwarding speed can be acquired after the particular frame.

Since the forwarding speed is automatically decreased at given point even if the user fast-forwards the picture, the user may easily find out the interesting or important scene. In addition, when the user searches the interesting scene from the fast-forwarding picture with particular information as a clue, the forwarding speed may decrease automatically at the frame having that information. Thus, the user can find out the scene more easily. The following practical uses are envisaged. Suppose that the picture contents is a drama, the scene where a particular actor appears may be reproduced at reduced speed during fast-forwarding. Suppose that the picture contents is a soccer game broadcast, the scoring scene may be reproduced at reduced speed during fast-forwarding.

EXAMPLE 5

In Example 4, without considering characteristics of every image frame, the predetermined number of image frames are extracted from an image frame sequence, and merge process is executed to the extracted image frames to create a fast-forwarding frame. This process is preferable to make a smoothly moving fast-forwarding picture. However, in some cases, it is more preferable that extracting some image frames by priority having some characteristics to create fast-forwarding picture. In this Example 5, an image frame processing device is provided for creating fast-forwarding picture having high watching efficiency by extracting some image frames by priority satisfied with particular conditions.

Figure 17:
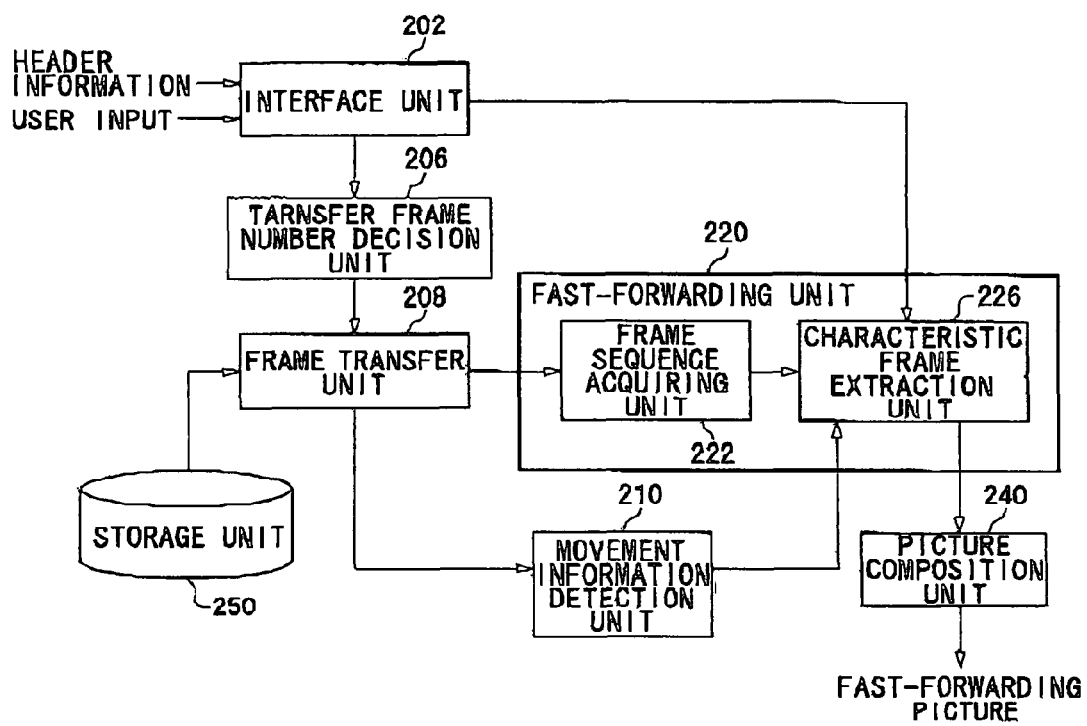
FIG. 17 shows a functional block diagram of the image frame processing device according to Example 5.

FIG. 17 shows a functional block diagram of an image frame processing device according to Example 5. The interface unit 202, the transfer frame number decision unit 206, the frame transfer unit 208, the frame sequence acquiring unit 222, the picture composition unit 240 and the storage unit 250 are same as blocks shown in FIG. 13, so same numerals are allotted to these blocks and further explanation for these blocks are omitted.

The fast-forwarding unit 220 includes the frame sequence acquiring unit 222 and a characteristic frame extraction unit 226. The characteristic frame extraction unit 226 extracts, as a characteristic frame, an image frame satisfying a predetermined condition from the image frames transferred from the frame transfer unit 208 based on its brightness information. For example, the characteristic frame extraction unit 226 computes the mean of pixels for each pixel included in ten forward and backward frames including a certain image frame, then extracts the image frame including pixels having 50% bigger than the average value as a characteristic frame. The characteristic frame extraction unit 226 extracts some suitable number of image frames other than these characteristic frames, creates a fast-forwarding frame, and send it to the picture composition unit 240. The picture composition unit 240 outputs the fast-forwarding frame at the predetermined frame rate that can be displayed on display 26.

Figure 18:
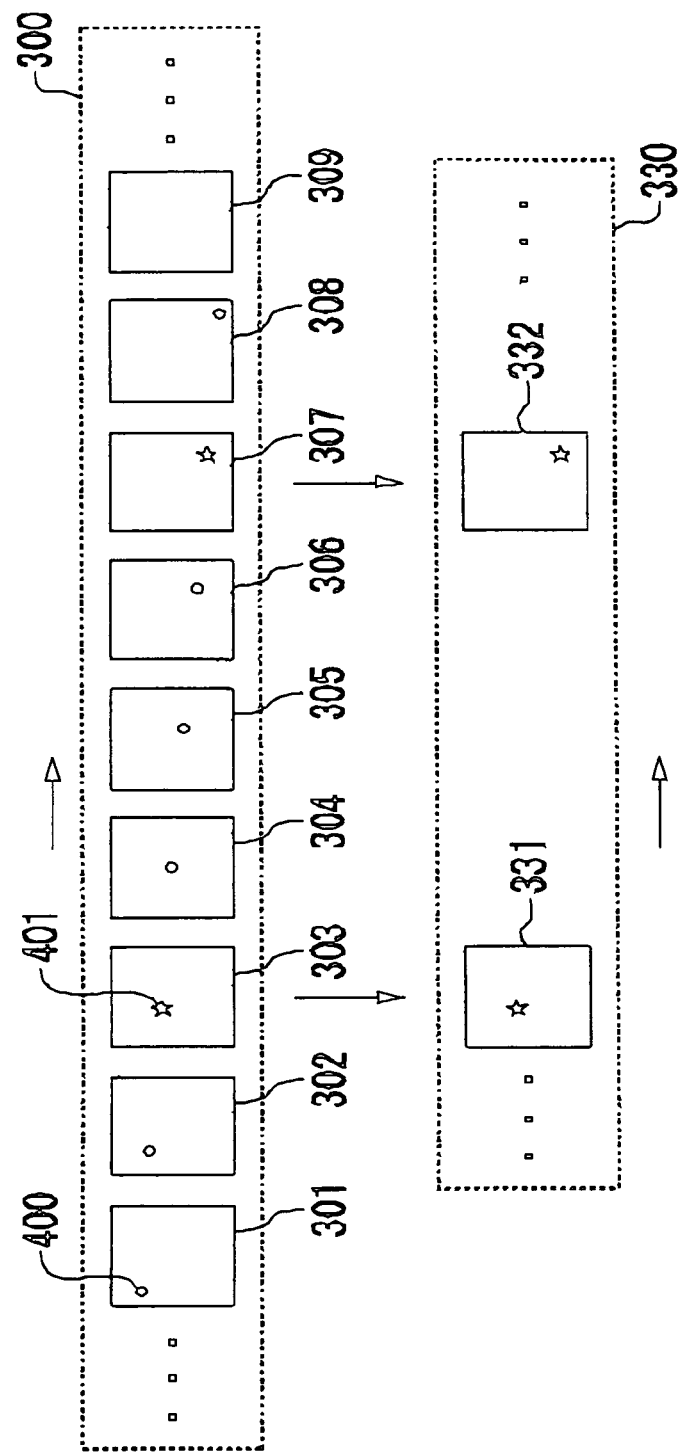
FIG. 18 shows the concept of the process for extracting image frames based on the brightness information.

Now, extracting characteristic frame according to Example 5 will be described more specifically. FIG. 18 shows the concept of the process of extracting some image frames from an image frame sequence based on to the brightness information. The image frame sequence 300 includes image frames 301-309 and a lot of other image frames ranging before and after those frames same with FIG. 14. The characteristic frame extraction unit 226 extracts an image frame including pixels of bigger brightness than that of other adjacent image frames as a characteristic image frame. As described above, the circular object 400 flickers in the image frames 303 and 307. Therefore, the image frames 303 and 307 are extracted as a characteristic frame respectively because of including pixels of bigger brightness than adjacent image frames. These characteristic frames become fast-forwarding frames 331 and 332 respectively without taking any process.

It is possible that frames needed for composing fast-forwarding picture at requested forwarding speed are not extracted only by extracting characteristic frames from the image frame sequence 300. So, if there is no characteristic frame extracted in a predetermined number of image frames, it is preferable for the characteristic frame extraction unit 226 to extract one frame from the predetermined number of image frames regardless of brightness information. On the contrary, if there are plural characteristic frames extracted in the predetermined number of image frames, it is preferable for the characteristic frame extraction unit 226 to extract only one frame. In this way, the fast-forwarding frame sequence 330 can be made.

Alternatively, when there are plural characteristic frames extracted based on brightness information in the predetermined number of image frames, all image frames determined as characteristic frames may be fast-forwarding frames regardless of forwarding speed information. In this way, image frames having pixels of bigger brightness are serially extracted for certain period. So, in that period, speed-reduced fast-forwarding picture having normal playing speed may be acquired. By this, since even in fast-forwarding picture, moving images nearly equal to normal playing can be acquired in characteristic scene, it may reduce the chance for the user to miss the important information in the characteristic scene. It is preferable to set conditions for characteristic frames depending on the type of information that the user wants to get.

In Example 5, since the fast-forwarding picture is created by extracting characteristic frames based on brightness information, the number of image frames having important information missed from the fast-forwarding picture is reduced.

It should be noted that the information for extracting characteristic frames is not limited to brightness information. For example, movement information between image frames may also be used for extracting some image frames having particular condition by priority.

Referring to FIG. 17, the movement information detection unit 210 receives image frames transferred from the frame transfer unit 208 and computes movement information between those image frames. For example, the movement information detection unit 210 obtains corresponding points between the image frames by using well-known block matching method. Then the movement information detection unit 210 computes motion vectors from the difference between the corresponding points. The motion vectors are used for the movement information. If some movement information for each of areas or objects in the image frame is prepared beforehand as data, this data may also be used as movement information.

The characteristic frame extraction unit 226 extracts, as a characteristic frame image frames, satisfying a predetermined condition from the transferred image frames based on movement information. The condition is that absolute value of the motion vector is larger than a predetermined value, for example. The characteristic frame extraction unit 226 extracts some appropriate number of image frames other than these characteristic frames, creates fast-forwarding frames and send the fast-forwarding frames to the picture composition unit 240. The picture composition unit 240 outputs the fast-forwarding frames at the predetermined frame rate to the display 26.

In another example, the characteristic frame extraction unit 226 receives information written in header part of the moving image data from the interface unit 202, and extracts characteristic frames based on that information. For example, suppose the contents of moving images are dramas, bit is enabled in header part of several tens or hundreds of image frames ranging before and after the point where the scene changes for indicating the scene change. The characteristic frame extraction unit 226 may extract image frames indicated by such bits as a characteristic frame. In this way, even in a fast-forwarding picture, forwarding speed becomes equal to the normal playing speed. Therefore, the user can recognize the contents in the fast-forwarding picture more easily.

EXAMPLE 6

In the Example 5, it is described that image frames satisfying particular condition are extracted as characteristic frames using brightness information or movement information. In other words, in Example 5, image frames in image frame sequence are separated to two groups. One group includes image frames which are beneficial for the user (that is, image frames having much information). The other group includes image frames which are less beneficial for the user (that is, image frames having less information). Then, more image frames are picked up from the first group to create fast-forwarding picture.

In Example 6, an image frame processing device will be provided to separate one image frame to two parts; one part having more information and the other part having less information. And either part is enhanced or made unnoticeable. With this, the user can get information from the fast-forwarding picture more easily.

Figure 19:
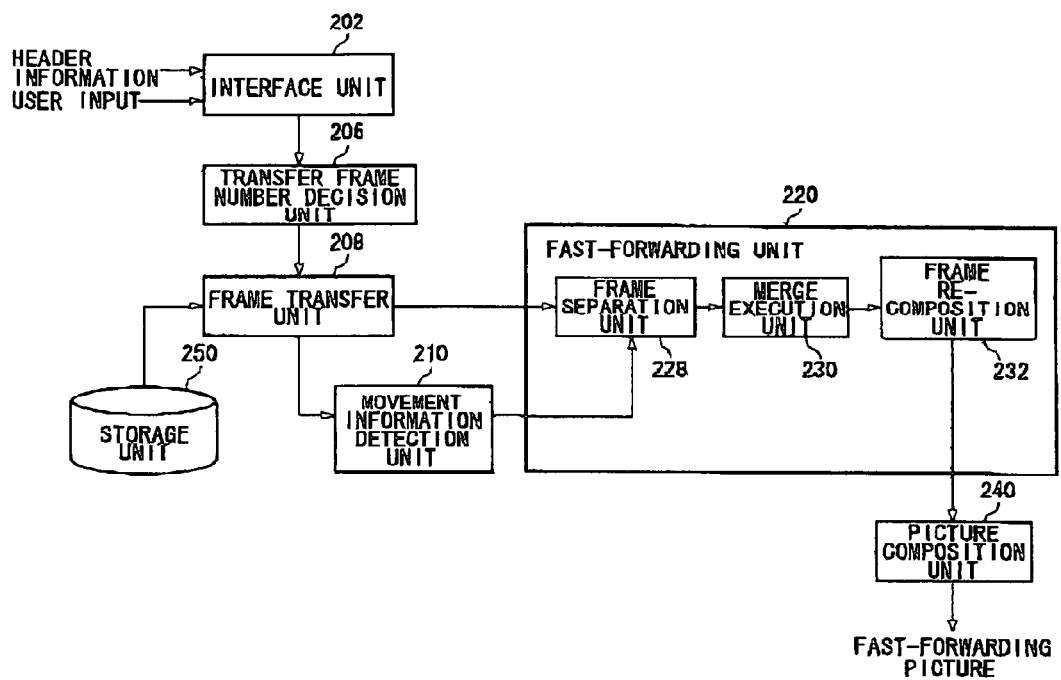
FIG. 19 is a functional block diagram of the image frame processing device according to Example 6.

FIG. 19 shows a functional block diagram of an image frame processing device according to the Example 6. The interface unit 202, the transfer frame number decision unit 206, the frame transfer unit 208, the movement information detection unit 210 and the storage unit 250 are same as blocks shown in FIG. 17, so same numerals are allotted to these blocks and further explanation for these blocks are omitted.

The fast-forwarding unit 220 includes a separation unit 228, a merge execution unit 230 and a frame re-composition unit 232. The separation unit 228 receives transferred image frames from the frame transfer unit 208. The separation unit 228 separates each image frame to "particular image area" and "non-particular image area". This separation is done based on movement information received from the movement information detection unit 210. The particular image area is an area where the absolute values of the motion vectors are larger than the predetermined threshold. The non-particular image area is an area other than the particular image area. The merge execution unit 230 executes merge process to non-particular image area between image frames. On the other hand, the merge execution unit 230 picks up any one particular image area from the image frames.

The frame re-composition unit 232 synthesizes a picked-up particular image area and merged non-particular image area to create an updated image frame. The updated image frame is sent to the picture composition unit 240 as a fast-forwarding frame. The picture composition unit 240 outputs fast-forwarding frames at the predetermined frame rate to display 26.

Figure 20:
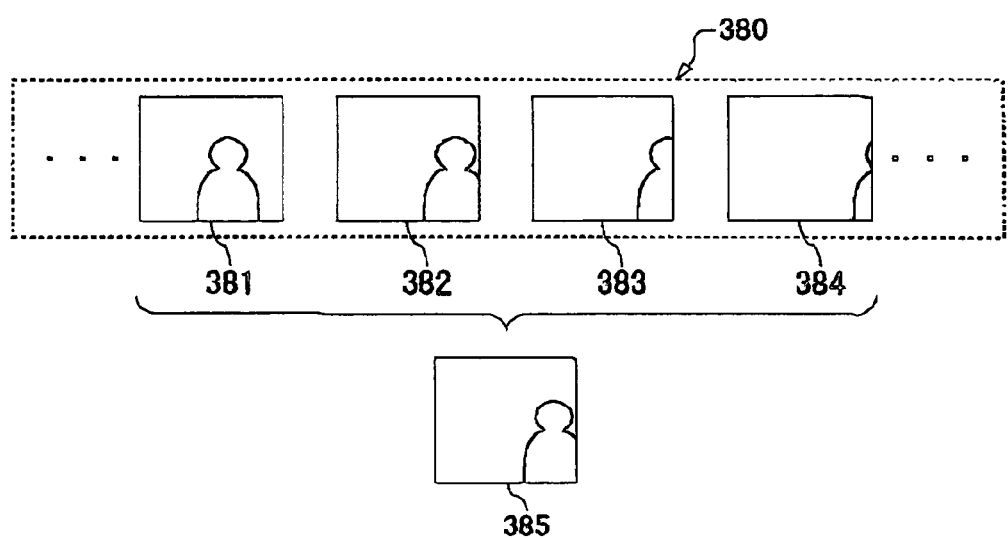
FIG. 20 shows the concept of the process for separating the image frame to particular image area and non-particular image area.

FIG. 20 shows the concept of separating an image frame to particular image area and non-particular image area. An image frame sequence 380 includes image frames 381-384 and a lot of image frames ranging before and after those image frames. The image frame sequence 380 includes a certain person's image. The image of the person can be detected as follows. The user designates a color and a pattern of the clothes the person wears. Then, the image area of the person is detected with the color and pattern as a clue using well-known image matching technology.

The separation unit 228 separates image frames 381-384 into particular image area for the image of the person and non-particular image area for background image. The merge execution unit 230 executes merge process to non-particular image area of image frames 381-384. The merge unit 230 picks up one particular image area from image frames 381-384. In FIG. 20, a particular image area of image frame 382 is picked up by the merge execution unit 230. Then, the frame re-composition unit 232 puts the particular image area picked up by the merge execution unit 230 and the merged non-particular image area together to create a fast-forwarding frame 385. The fast-forwarding frame 385 has blurred background image due to the merge process. Thus, the fast-forwarding picture including frame 385 may display the certain person with motion blurred background, so the user can recognize the person more easily.

As described above, according to the Example 6, important part in the image frame can be displayed definitely in the fast-forwarding picture. In other words, according to the Example 6, less important part in the image frame can be made unnoticeably due to motion blur.

In this way, when contents Of moving images are a drama or sports broadcast, user's favorite person can be displayed noticeably in the fast-forwarding picture.

Alternatively, when the non-particular image area is a still image, the merge unit 230 uses plural non-particular image areas to enhance its image quality.

EXAMPLE 7

Figure 21:
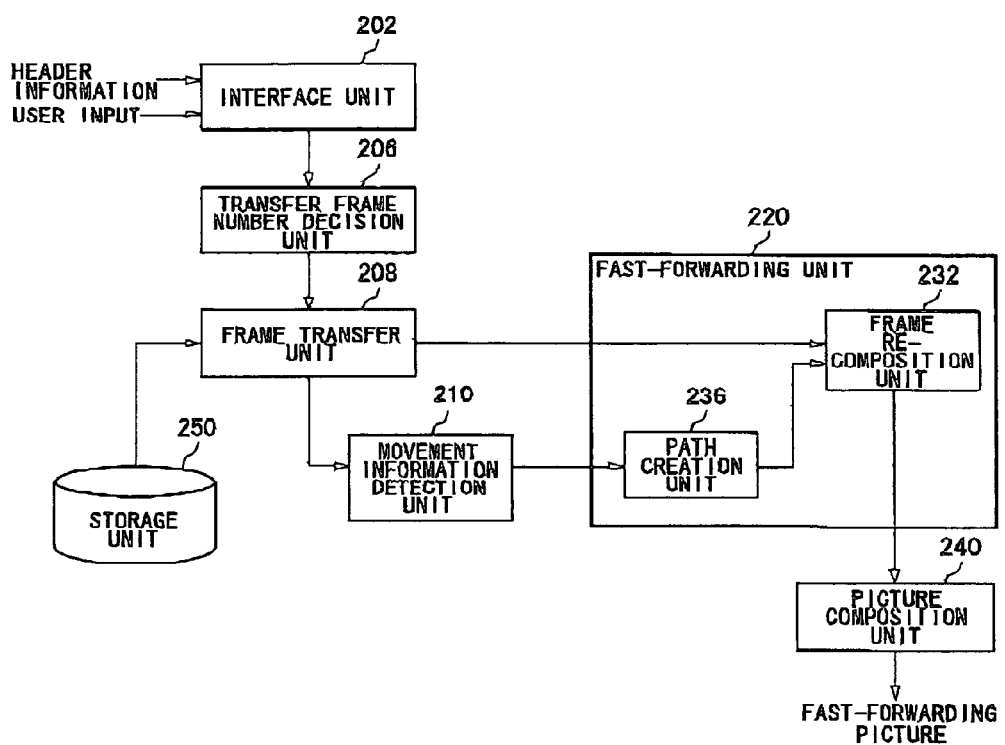
FIG. 21 is a functional block diagram of the image frame processing device according to Example 7.

FIG. 21 shows a functional-block diagram of an image frame processing device according to Example 7. In this Example 7, a path (track) of the object in image frame is displayed in fast-forwarding picture.

The interface unit 202, the transfer frame number decision unit 206, the frame transfer unit 208, the movement information detection unit 210, the picture composition unit 240 and the storage unit 250 are same as blocks shown in FIG. 17, so same numerals are allotted to these blocks and further explanation for these blocks are omitted.

The fast-forwarding unit 220 includes a path creation unit 236 and frame re-composition unit 232. The path creation unit 236 creates a path image using the movement information received from the movement information detection unit 210. This path image is the image displaying a flow line of a predetermined object in the image frames transferred from the frame transfer unit 208. The frame re-composition unit 232 overwrites the path image on the original image frame to create a fast-forwarding frame.

Figure 22:
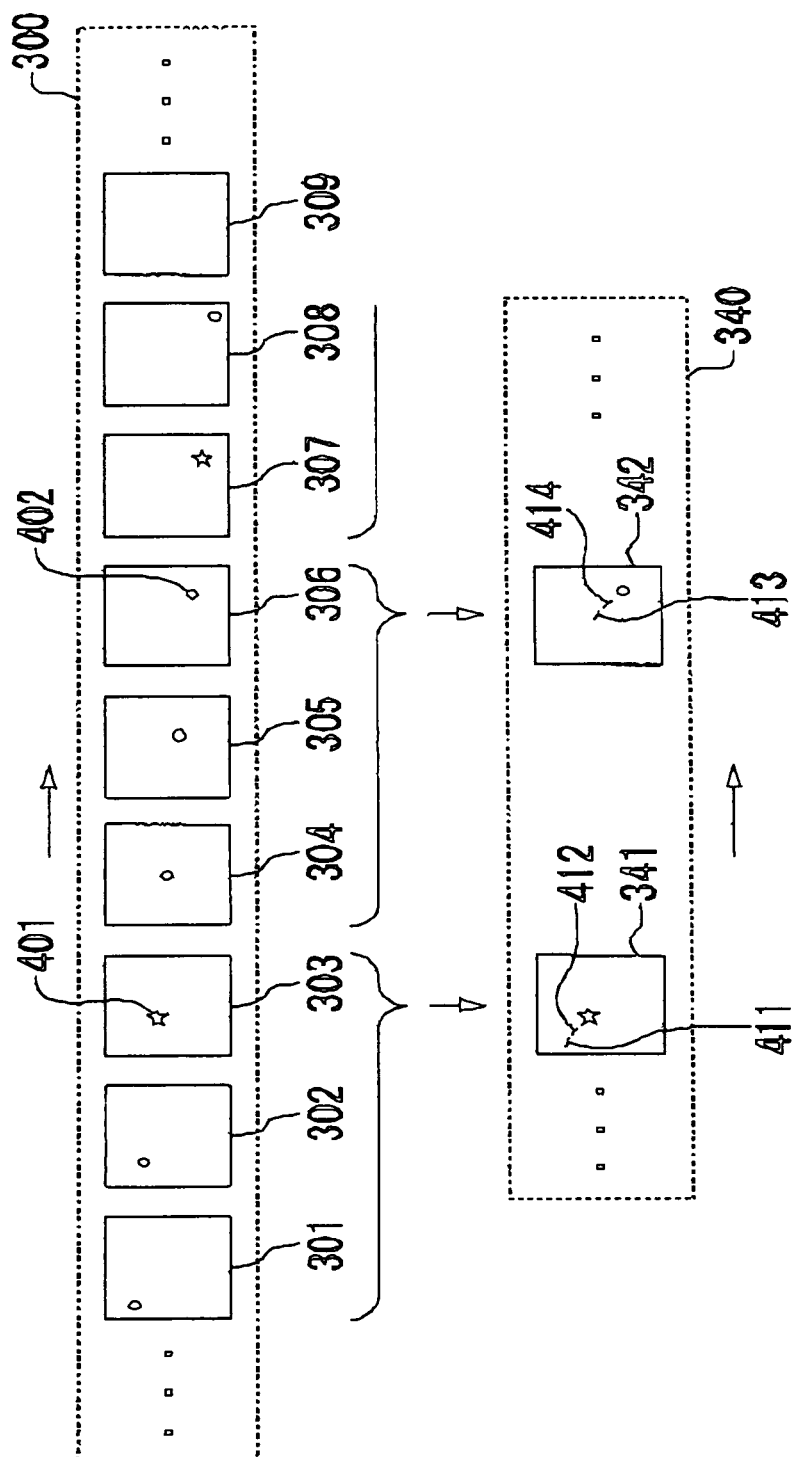
FIG. 22 shows the concept of the path display process.

FIG. 22 shows the concept of the path creating process according to the Example 7. The image frame sequence 300 includes image frames 301-309 and a lot of image frames ranging before and after those images same as FIG. 14.

The path creation unit 236 creates a path image 411 from a difference between the image frame 301 and image the frame 302. The path creation unit 236 creates a path image 412 from a difference between the image frame 302 and image the frame 303. The frame re-composition unit 232 puts the path images 411 and 412 to the image frame 303 to create a fast-forwarding frame 341. Similarly, the path creation unit 236 creates a path image 413 from a difference between the image frame 304 and image the frame 305. The path creation unit 236 creates a path image 414 from a difference between the image frame 305 and the image frame 306. The frame re-composition unit 232 puts the path images 413 and 414 to the image frame 306 to create a fast-forwarding frame 342. Same process is repeated to the frame image 307 or later.

The picture composition unit 240 outputs a fast forwarding frame sequence 340 including the fast-forwarding frame 341 and 342 at a predetermined frame rate. Thus, the fast-forwarding picture having the path showing the movement of the circular object 400 may be acquired.

To determine which object is selected among objects resided in the image frame for displaying its path, various well-known methods may be used. For example, a predetermined object (for example, a soccer ball) is detected in each image frame using well-known image recognition technology, and path of the soccer ball may be displayed in the fast-forwarding picture.

According to the Example 7, it is possible to display the information which does not appear in the original image frame in the fast-forwarding picture. In other words, by using the difference information between image frames, it is possible to enhance the information in the image frames.

EXAMPLE 8

By selecting one process according to the Examples 4 through 7 described above, fast-forwarding picture suitable for contents or user's purpose may be produced. For example, depending on the contents of moving images recorded in the storage device, suitable fast-forwarding may be selected.

Now, suppose that the image frame processing device is incorporated into the moving image playing apparatus, fast-forwarding picture creating process will be described.

Figure 23:
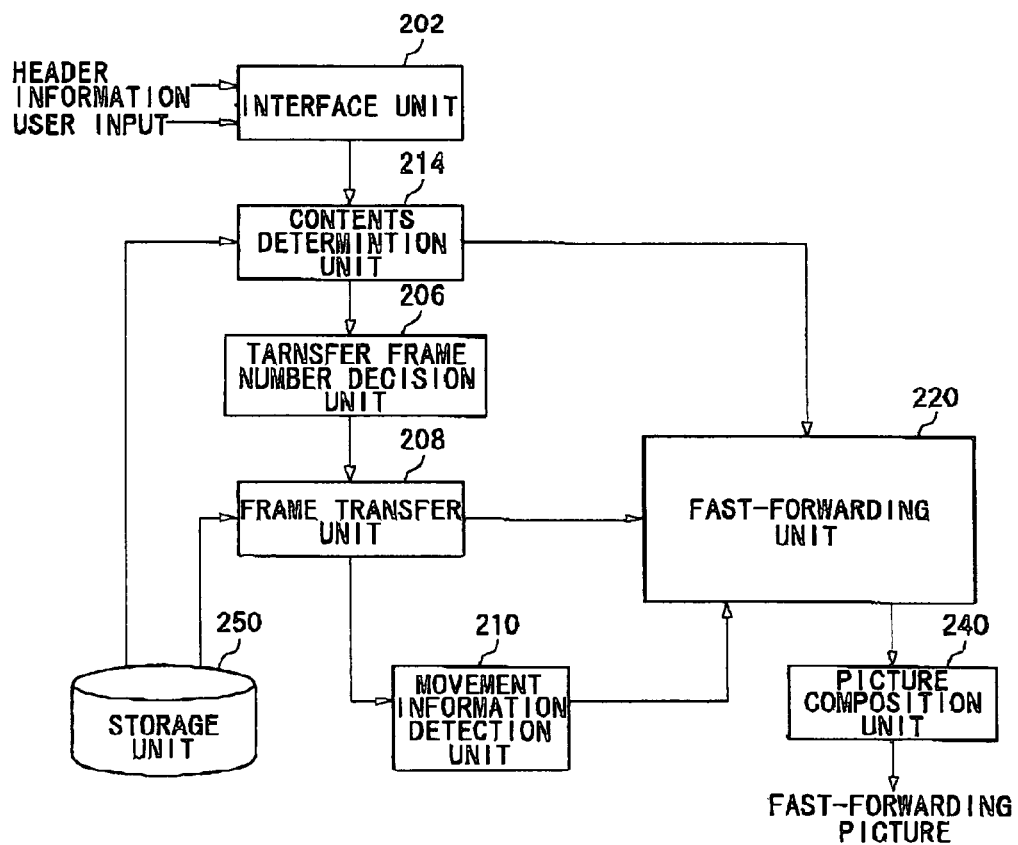
FIG. 23 is a functional block diagram of the image frame processing device that can realize the processes according lo Examples 4 to 7.

FIG. 23 shows a functional block diagram of the image frame process apparatus which can realize all process according to the Examples 4 through 7. The interface unit 202, the transfer frame number decision unit 206, the frame transfer unit 208, the movement information detection unit 210, the picture composition unit 240 and the storage unit 250 are same as blocks shown in FIG. 13, so same numerals are allotted to these blocks and further explanation for these blocks are omitted.

The fast-forwarding unit 220 is configured to be able to execute all process described in the Examples 4 through 7. The image frame processing device further includes a contents determination unit 214. The contents determination unit 214 determines the contents type of moving images stored in the storage unit 250. This determination may be made based on the header information of the moving images data. Alternatively, the determination may be made based on the user's input or movement information from the movement information detection unit 210. Determined contents type is sent to the fast-forwarding unit 220. The fast-forwarding unit 220 receives image frames transferred from the frame transfer unit 208, and executes one process according to the Examples 4 through 7 depending on the type of contents.

Now, when the contents type determined by the contents determination unit 214 is sports broadcast, drama or movie, or user's original movie, specific process executed by the fast-forwarding unit 220 will be described.

A. Sports Broadcast

When the contents type is video recording of a soccer match, it is possible to reduce the forwarding speed of the fast-forwarding picture only in scoring scene. The scoring scene can be detected as follows: moving images are captured by the fixed position camera pointing to a goal post. A goal mouth area is specified beforehand within the captured image by the camera. When the soccer ball image enters in the goal mouth area, which may be detected by image matching method, the fast-forwarding unit 220 determines it as a scoring scene and extracts plural image frames before and after that time point. In addition, the unit 220 may determine particular player with color, pattern or number of the uniform thereof as a clue using image matching technology. Then, the fast-forwarding picture which enhances the motion of particular player can be acquired by applying motion blur to other players. Additionally, the soccer ball in the image frames is recognized using image matching technology and the fast-forwarding picture having path of the soccer ball may be acquired.

B. Drama/Movie

When the contents type is a drama program, for example, the unit prompts the user to input the color or pattern of his/her favorite actor in the drama. Then the fast-forwarding unit 220 detects the object having the area corresponding to input color and pattern by well-known image matching technology. With this, the unit 220 may identify the scene where the favorite actor appears and creates the fast-forwarding picture with reduced forwarding speed for the identified scenes.

C. User's Original Movie

When the moving images stored in the storage unit 250 is images captured by a portable camera by the user, the fast-forwarding unit 220 detects break of scenes using well-known scene change extraction technology. By including the image frames before and after the break of scene to the fast-forwarding picture, the contents may be grasped easily in the fast-forwarding picture. In addition, the object chased with a portable camera is detected using optical flows. Then, background image except the chased objects is motion-blurred in the fast-forwarding picture. With this, the fast-forwarding picture with the chased object being easy to watch may be created.

As described above, according to the image frame processing device shown in FIG. 23, fast-forwarding picture suitable processed for the content type of the moving image or user's preference may be acquired.

According to the second embodiment of the invention, based on image frame sequence stored beforehand in a DVD drive or a hard disk drive and so on, when the fast-forwarding request is received, predetermined process is executed to the image frame sequence to create fast-forwarding frames. Then, the fast-forwarding frames are output at the frame rate which is needed to display the fast-forwarding picture for the fast-forwarding request. One feature of the second embodiment is that the fast-forwarding picture may have various added values by executing various processes to the image frame sequence. The added value includes: important information of the original image frame sequence is remained in the fast-forwarding picture as much as possible (Example 4 and 5); needless information of the image frame sequence is omitted in the fast-forwarding picture (Example 6).

In the second embodiment, after receiving a fast-forwarding request signal, fast-forwarding frames are created almost real-time and output as fast-forwarding picture. Therefore, it is possible to output various fast-forwarding picture created by different process every time receiving the fast-forwarding request signal depending on the condition or the user's designation. In other words, in the second embodiment, there is high versatility in the fast-forwarding unit corresponding to postprocessing process, various fast-forwarding picture having different advantage may be provided.

The image frame sequence of the moving images stored in the storage unit 250 is created at predetermined frame rate irrelevant to forwarding speed. However, the fast-forwarding unit executes the process depending on the fast-forwarding request signal or contents type to create an updated image frame sequence for fast-forwarding. As can be seen from above description, there is common concept in the first embodiment and the second embodiment in that frames displayed to the user is created by sampling the image frames prepared higher rate than the displaying rate. The second embodiment corresponds to the special case of the first embodiment where time axis for sampling is elongated.

It should be noted that application of the second embodiment is not limited to create fast-forwarding picture or fast-rewarding picture. For example, using the moving images captured by the high-speed camera, normal playing images having some effects described above may be created according to the second embodiment. In this case, following condition should be satisfied:

$$N_s \geq N_p \geq N_o$$

where $N_s$ represents the number of the image frames per unit time captured by the high-speed camera, $N_p$ represents the number of the image frames per unit time stored in the storage unit, and $N_o$ represents the number of the image frames per unit time finally output to the display.

The present invention has been described based on some embodiments. These embodiments are illustrative in nature and it will be obvious to those skilled in the art that various variations in constituting elements and processes are possible within the scope of the present invention. Optional combinations of the constituting elements described in the embodiments, and implementations of the invention in the form of methods, apparatuses, systems, computer programs and recording mediums may also be practiced as additional modes of the present invention.

What is claimed is:

1. An image frame processing device comprising:
    an interface unit for acquiring a condition that an image frame should meet for output to a display, wherein the condition is an output resolution defined depending on whether contents of images displayed on the display comprise a still image or moving images;
    a rendering processing unit for performing rendering at a predetermined frame rate independent of said condition to generate an image frame sequence based on given geometry data;
    a postprocessing unit for performing a predetermined process on the image frame sequence generated by said rendering processing unit, in accordance with said condition acquired by said interface unit, to generate an updated image frame sequence for the display;
    a first memory storing the image frame generated by said rendering processing unit; and
    a second memory used by said postprocessing unit as a work area,
    wherein said rendering processing unit starts rendering a set of image frames in the image frame sequence with mutually different offsets of coordinates in a rendering space, and
    wherein said postprocessing unit locates the set of image frames generated by the offset rendering in a single coordinate system and samples pixels in the coordinate system to generate an updated image frame sequence with a higher resolution and a lower frame rate than those of the image frame sequence output from said rendering processing unit, and
    wherein said first memory has a capacity for storing at least one image frame generated by said rendering processing unit, the image frame temporarily stored in said first memory is transferred to said second memory, and said postprocessing unit reads out a plurality of image frames for the predetermined process from said second memory.

2. The image frame processing device according to claim 1, further comprising:
    a first memory storing the image frame generated by said rendering processing unit; and
    a second memory used by said postprocessing unit as a work area,
    wherein said first memory is built into the same semiconductor circuit element as at least said rendering processing unit.

3. The image frame processing device according to claim 2, wherein a main memory is used as said second memory.

4. A rendering method of a processor, said method comprising:
    acquiring a condition that an image frame should meet for output to a display, wherein the condition is an output resolution defined depending on whether contents of images displayed on the display comprise a still image or moving images;
    rendering, by said processor, at a predetermined frame rate independent of the condition that an image frame sequence should meet for output to the display; and
    converting, by said processor, the image frame sequence generated by said rendering into an updated image frame sequence which is dependent on said condition in postprocessing,
    wherein said rendering further includes starting rendering a set of image frames in the image frame sequence with mutually different offsets of coordinates in a rendering space, and wherein said postprocessing further includes locating the set of image frames generated by offset rendering in a single coordinate system and sampling pixels in the single coordinate system to generate an updated image frame sequence with a higher resolution and a lower frame rate than those of the image frame sequence output from said rendering step, wherein the image frame generated by said rendering step is stored in a first memory and said postprocessing uses a second memory as a work area, and wherein said first memory has a capacity for storing at least one image frame generated by said rendering step, the image frame temporarily stored in said first memory is transferred to said second memory, and said postprocessing includes reading out a plurality of image frames for a predetermined process from said second memory.

5. The rendering method according to claim 4, wherein a memory storing the image frame generated by said rendering is built into a same semiconductor circuit element as said processor.

6. An image frame processing device comprising:

an interface unit for acquiring a condition that an image frame should meet for output to a display, wherein the condition is an output resolution defined depending on whether contents of images displayed on the display comprise a still image or moving images;

a rendering processing unit for performing rendering at a predetermined frame rate independent of said condition to generate an image frame sequence based on given geometry data;

a postprocessing unit for performing a predetermined process on the image frame sequence generated by said rendering processing unit, in accordance with said condition acquired by said interface unit, to generate an updated image frame sequence for the display;

a first memory storing the image frame generated by said rendering processing unit; and a second memory used by said postprocessing unit as a work area, wherein said rendering processing unit starts rendering a set of image frames in the image frame sequence with mutually different offsets of coordinates in a rendering space, wherein said postprocessing unit locates the set of image frames generated by the offset rendering in a single coordinate system and blends pixels in the coordinate system to generate an updated image frame sequence with the same resolution and a lower frame rate than those of the image frame sequence output from said rendering processing unit, and wherein said first memory has a capacity for storing at least one image frame generated by said rendering processing unit, the image frame temporarily stored in said first memory is transferred to said second memory, and said postprocessing unit reads out a plurality of image frames for the predetermined process from said second memory.

7. A non-transitory computer-readable medium having stored therein a program causing a computer to execute steps of:

acquiring a condition that an image frame should meet for output to a display, wherein the condition is an output resolution defined depending on whether contents of images displayed on the display comprise a still image or moving images;

rendering an image frame sequence on a memory based on given geometry data; and postprocessing the image frame sequence generated by said rendering step so as to adapt it to the display, wherein said rendering step generates the image frame sequence by performing rendering at a predetermined frame rate independent of the condition that the image frame should meet for output to the display, said postprocessing step subjects the image frame sequence generated by the rendering step to a predetermined process so as to generate and output an updated image frame sequence that meets said condition, wherein said rendering includes starting rendering a set of image frames in the image frame sequence with mutually different offsets of coordinates in a rendering space, and wherein said postprocessing unit locates the set of image frames generated by the offset rendering in a single coordinate system and blends pixels in the coordinate system to generate an updated image frame sequence with the same resolution and a lower frame rate than those of the image frame sequence output from said rendering processing unit, wherein the image frame generated by said rendering step is stored in a first memory and said postprocessing step uses a second memory as a work area, and wherein said first memory has a capacity for storing at least one image frame generated by said rendering step, the image frame temporarily stored in said first memory is transferred to said second memory, and said postprocessing step includes reading out a plurality of image frames for a predetermined process from said second memory.

* * * * *